United States Patent [19]

Otsuka et al.

[11] Patent Number: 5,974,360
[45] Date of Patent: Oct. 26, 1999

[54] METHOD AND EQUIPMENT FOR WEATHER IMAGE PREDICTION

[75] Inventors: Kazuhiro Otsuka, Yokosuka; Tsutomu Horikoshi; Satoshi Suzuki, both of Yokohama; Hidetomo Sakaino, Yokosuka, all of Japan

[73] Assignee: Nippon Telegraph and Telephone Corporation, Japan

[21] Appl. No.: 08/989,655

[22] Filed: Dec. 12, 1997

[30] Foreign Application Priority Data

Dec. 13, 1996 [JP] Japan .................................. 8-333763
Mar. 11, 1997 [JP] Japan .................................. 9-056200
Apr. 30, 1997 [JP] Japan .................................. 9-112718

[51] Int. Cl.$^6$ .................................................. G06F 19/00
[52] U.S. Cl. .............................................. 702/3; 342/26
[58] Field of Search ........................... 702/3, 4; 706/931; 342/26

[56] References Cited

U.S. PATENT DOCUMENTS

| | | | |
|---|---|---|---|
| 5,406,481 | 4/1995 | Shinozawa et al. | 702/3 |
| 5,440,483 | 8/1995 | Badoche-Jacquet et al. | |
| 5,717,589 | 2/1998 | Thompson et al. | 702/3 |
| 5,839,089 | 11/1998 | Yasuda et al. | 702/3 |
| 5,850,619 | 12/1998 | Rasmussen et al. | 702/3 |

FOREIGN PATENT DOCUMENTS 8-271649 10/1996 Japan .

OTHER PUBLICATIONS

Y. Asuma et al., "A Method for Estimating the Advection Velocity of Radar Echoes Using a Simple Weather Radar System", Geophysical Bulletin of Hokkaido University, vol. 44, Oct., 1984, pp. 23–34.

Y. Asuma et al., "Experiments for a Very–short–range Prediction of Snowfall Using a Simple Weather Radar System Part. 1—Outline and Possibility—", Geophysical Bulletin of Hokkaido University, vol. 44, Oct., 1984, pp. 35–51.

K. Otsuka et al., "Precipitation Forecasting Based on Segmentation of Spatiotemporal Velocity Field", Proceedings of the $54^{th}$ Annual Convention IPS Japan, May 1997.

K. Otsuka et al., "Precipitation Forecast Based on Segmentation of Radar Echo Motion Field", Proc. AMS Conf. On Radar Meterology, Sep., 1997.

*Primary Examiner*—Donald E. McElheny, Jr.
*Attorney, Agent, or Firm*—Pennie & Edmonds LLP

[57] ABSTRACT

An equipment for weather image prediction comprising: a field extracting portion, which calculates the velocity fields of the local echoes with respect to time and space from a plurality of time sequential frames of weather radar images for a plurality of frames therein, and which segments and extracts a field possessing similar velocities with respect to time and space as one precipitation field from said plurality of frames of weather radar images by employing said calculated velocity fields; a moving velocity estimating portion, which estimates the moving velocity of a precipitation field by obtaining the amount of movement, among the neighboring frames, of the precipitation field segmented and extracted by said field extracting portion; and a forecast image generating portion, which extrapolates a plurality of precipitation fields by employing a distance taken by multiplying the moving velocity of the precipitation field estimated by said moving velocity estimating portion by a desired forecasting time, and which generates a forecast radar image by synthesizing the resulting image.

33 Claims, 26 Drawing Sheets

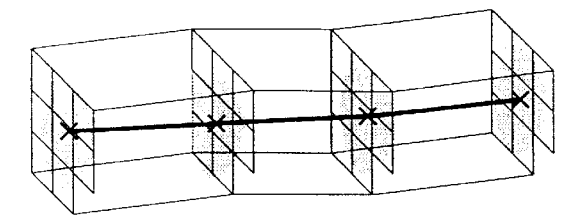
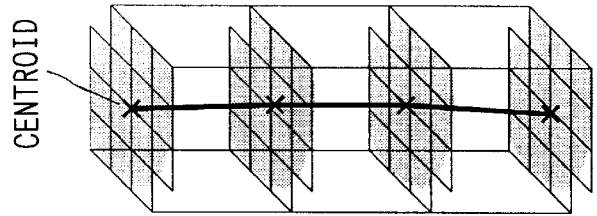
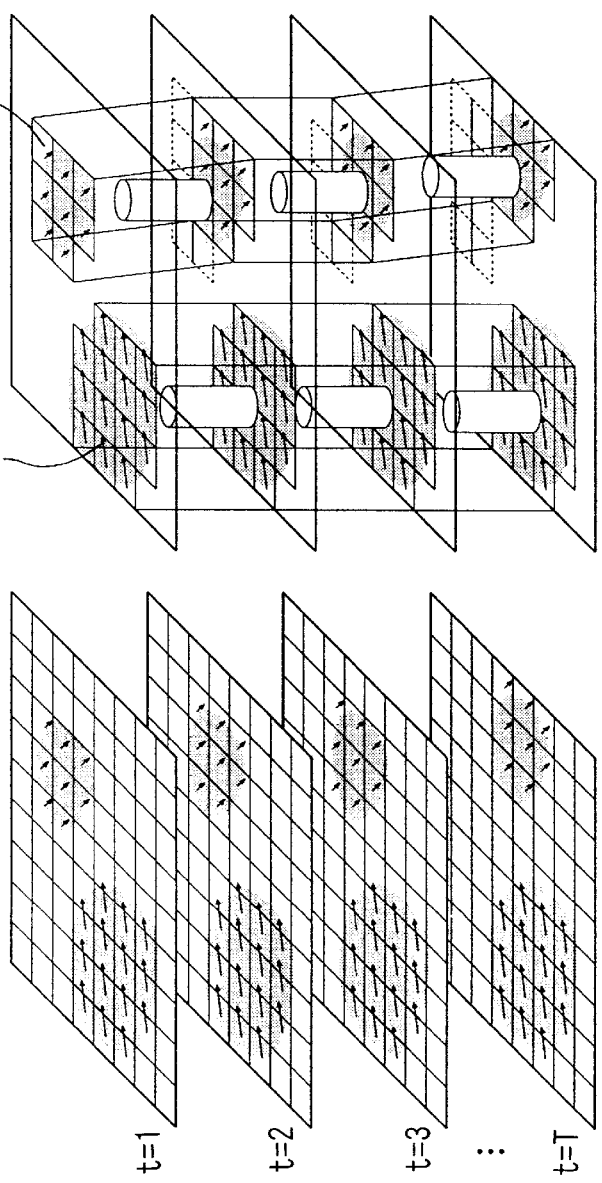

AFTER 1 HOUR    AFTER 2 HOURS    AFTER 3 HOURS

FIG.9A
FIG.9B
FIG.9C
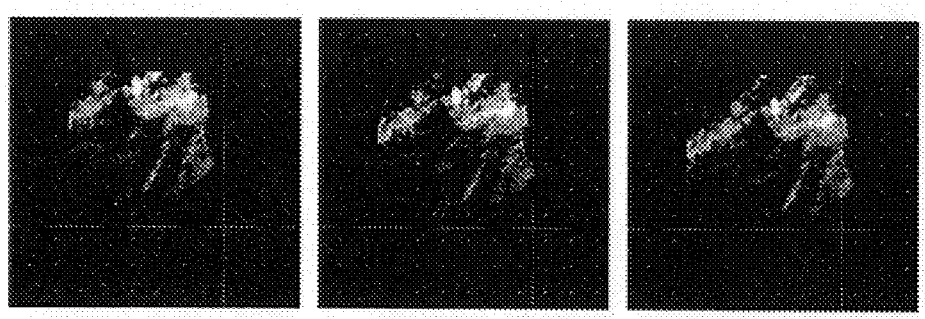
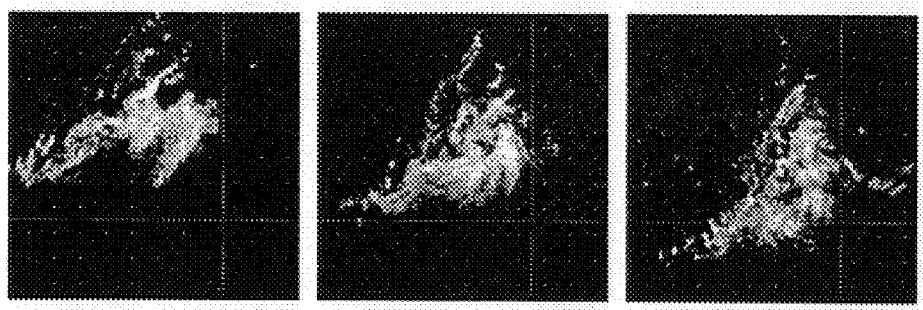
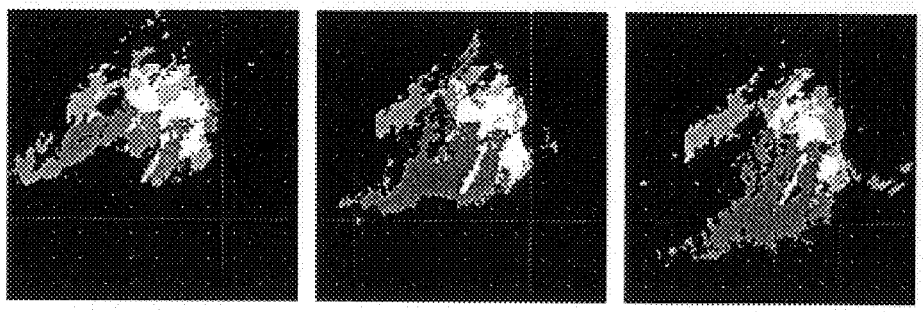
AFTER 1 HOUR     AFTER 2 HOURS     AFTER 3 HOURS FIG.19A
FIG.19B
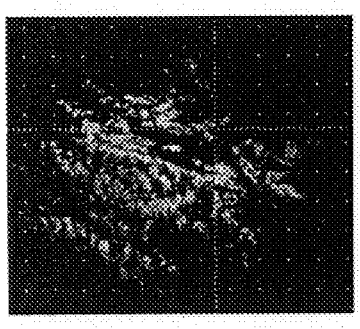
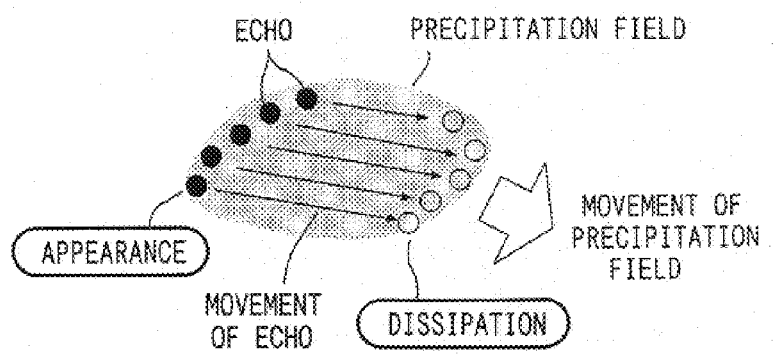

METHOD AND EQUIPMENT FOR WEATHER IMAGE PREDICTION

BACKGROUND OF THE INVENTION

1. Technical Field of the Invention

The present invention relates to a method and equipment for weather image prediction which has the objective of predicting weather phenomena such as the amount of precipitation or the amount of clouds, which is accomplished through predicting the local, short-term weather radar images by employing weather radar images obtained from a weather radar apparatus.

This application is based on the Japanese Patent Applications No. Hei 8-333763, No. Hei 9-056200, and No. Hei 9-112718 filed in Japan, the contents of which are incorporated herein by reference.

2. Description of the Related Art

With regard to conventional prediction methods employing weather radar images, cross-correlation methods are widely used, for example, as seen employed in Publication [1] Yoshio Asuma, Katsuhiro Kikuchi, and Hisashi Kon: "A Method for Estimating the Advection Velocity of Radar Echoes Using a Simple Weather Radar System", Geophysical Bulletin of Hokkaido University, Vol. 44, October, 1984, pp. 23–34 and Publication [2] Yoshio Asuma, Katsuhiro Kikuchi, and Hisashi Kon: "Experiments for a Very-Short-Range Prediction of Snowfall Using a Simple Weather Radar System", Geophysical Bulletin of Hokkaido University, Vol. 44, October, 1984, pp. 35–51.

This method employs two weather radar images measured at an arbitrary time interval ΔT apart. While shifting one of the images, the correlation value of the image gray level is calculated, and the shift indicating the greatest correlation value is made to be the amount of movement of the precipitation field between the two frames. Employing this amount of movement, a parallel translation is performed on the precipitation field within the most current weather radar image. The resulting image is the forecast image.

Concretely speaking, the cross-correlation coefficient is obtained using the equation below from the two weather radar images R1, R2, as illustrated in FIG. 27, which are measured at a time interval Δt apart. Here, the gray level of the image or the lattice point (i, j) in the radar image is made to be R1(i, j) and R2(i, j), respectively, for the two measured images R1, R2. The fields to be correlated are A and B, respectively. The shift of the two radar images when calculating the correlation value is made to be (k,l). (In FIG. 27, the oblique lines indicate the field to be correlated, and the bold arrow in the center shows the direction of the movement of the echo pattern.)

$$\sigma_{k,l} = \frac{\sum_{i=1}^{A}\sum_{j=1}^{B} R_1(i,j) R_2(i+k, j+l) - AB \overline{R_1}\, \overline{R_2}}{\sqrt{\left(\sum_{i=1}^{A}\sum_{j=1}^{B} R_1(i,j)^2 - AB\overline{R_1}^2\right)\left(\sum_{i=1}^{A}\sum_{j=1}^{B} R_2(i,j)^2 - AB\overline{R_2}^2\right)}} \tag{1}$$

$$\overline{R_1} = \frac{\sum_{i=1}^{A}\sum_{j=1}^{B} R_1(i,j)}{AB} \tag{2}$$

$$\overline{R_2} = \frac{\sum_{i=1}^{A}\sum_{j=1}^{B} R_2(i+k, j+l)}{AB} \tag{3}$$

The cross-correlation value obtained through the calculation using the above equations may be as illustrated in FIG. 28, for example. At this point, a interpolation based on a second order function is performed on the cross-correlation value $\sigma_{K,L}$ at point (K,L) of the lattice point where the greatest cross-correlation value exists, and the four cross-correlation values in its vicinity, $\sigma_{-x}$, $\sigma_{+x}$, $\sigma_{-y}$, $\sigma_{+y}$. And the shift (k', l') between the point (not necessarily a lattice point) where the cross-correlation value resulting from the compensation is greatest is obtained through the following equation (FIG. 29, only the X component is illustrated).

$$k' = \frac{\sigma_{-x} - \sigma_{+x}}{2(\sigma_{-x} - 2\sigma_{K,L} + \sigma_{+x})} \tag{4}$$

$$l' = \frac{\sigma_{-y} - \sigma_{+y}}{2(\sigma_{-y} - 2\sigma_{K,L} + \sigma_{+y})} \tag{5}$$

According to the above, when the two weather radar images R1, R2 are shifted by (K+k', L+l'), the cross-correlation value is greatest. From this fact, the movement vector of the echo pattern can be obtained from the equation (6) and equation (7) below. This movement vector shows the direction and the speed of the movement of the precipitation field. Here, $V_x$ and $V_y$ indicates the x component and the y component of the amount of movement.

$$V_x = \frac{(K+k')\Delta x}{\Delta t} \tag{6}$$

$$V_y = \frac{(L+l')\Delta y}{\Delta t} \tag{7}$$

Next, by extrapolating the echo pattern within a weather radar image measured at a certain time by employing the movement vector obtained through the equations (6), (7), a radar image of a time after the measured time is predicted.

Using the weather radar image I (i, j) as the input image, a forecast image J (i, j) of a time ΔT after the measured time of the weather radar image I (i, j) is obtained from the calculated movement vector, employing $V_x$ and $V_y$. The forecast image J (i, j) is defined to be an image resulting from the parallel translation of the input image I (i, j) based on the amount of movement in the horizontal direction $S_x$ and the amount of movement in the vertical direction $S_y$, $$S_x = \Delta T \cdot V_x \tag{8}$$

$$S_y = \Delta T \cdot V_y \tag{9}$$

However, the amount of movement is not restricted to integer values. If the shift from the lattice point of the moved image is expressed by $$\delta x = S_x - \lfloor S_x \rfloor \tag{10}$$

$$\delta y = S_y - \lfloor S_y \rfloor \tag{11}$$

-continued $\lfloor Z \rfloor$ is the largest integer which does not exceed Z, then the forecast image J (i, j) is defined to be $$J(i, j) = (1 - \delta x)(1 - \delta y)I(i - \lfloor S_x \rfloor, j - \lfloor S_y \rfloor) + \qquad (12)$$
$$(1 - \delta x)\delta y I(i - \lfloor S_x \rfloor, j - \lfloor S_y \rfloor + 1) +$$
$$\delta x(1 - \delta y)I(i - \lfloor S_x \rfloor + 1, j - \lfloor S_y \rfloor) +$$
$$\delta x \delta y I(i - \lfloor S_x \rfloor + 1, j - \lfloor S_y \rfloor + 1)$$

The lattice point of the forecast image J which have no correspondence to that of the input image, that is, the blank space of the forecast image resulting from the parallel translation, is set to have the value of zero.

Further, the forecast image can be obtained in the same manner even for the cases other than where $v_x > 0$ and $V_y > 0$.

At this point, the problems posed by the above described method will be made clear by a comparison with the characteristics of the echo within the actual weather radar image.

FIGS. 30A–30B illustrate an example of a typical echo. As can be seen in FIGS. 30A–30B, the radar echo within the weather radar image has large and small echo cells as its fundamental elements, and when these echo cells form a group, one precipitation field is formed. Hereinafter, these echo cells will simply be referred to as echoes. In a weather radar image, a precipitation field possessing a plurality of different dynamics may exist. Although echoes may be generalized as moving along with the flow of the atmosphere, there is a constant repetition of deformation and appearance and dissipation. In addition, especially in the case of FIGS. 30A–30B, the echoes appear at a certain position, move forming a band-shape, and dissipate at a certain position. However, the movement of the precipitation field formed by the group of these echoes is extremely slow when compared to the movement velocity of the echoes.

However, this cross-correlation method calculates one or more global movement vectors based on the correlation value of the gray level of a wide range from the radar images of the two frames. Thus, the moving velocity of the above echo and the moving velocity of the precipitation field cannot be distinguished. Consequently, in the case where the calculated moving vector corresponds to the moving velocity of the echo, there is a problem where the forecasted precipitation field moved to a location widely different from the actual location.

Moreover, since the image gray level changes from one frame to another due to unstable factors such as the deformation and appearance and dissipation of the echoes, there is a problem where the moving components of the echoes and the precipitation field cannot be stably and accurately calculated.

Furthermore, since one or more moving vectors are calculated with respect the radar image, and the image is simply undergoing a parallel translation, there is also a problem that, in the case where the precipitation field possessing a plurality of different movements exists, it is not possible to treat each of the precipitation fields separately, thereby reducing the accuracy of the forecast.

In conclusion, the above described method cannot distinguish the moving velocity of the echoes with the moving velocity of the precipitation field, and it makes the stable and accurate calculation of the moving velocities of the echoes and the precipitation field very difficult due to the influences of the unstable factors such as the appearance, dissipation, and deformation of the echoes, and further, it cannot handle precipitation fields possessing a plurality of different movements. Due to such various problems, the above method could not forecast a weather radar image of high accuracy.

SUMMARY OF THE INVENTION

The present invention proposes to offer a method and equipment for predicting a highly accurate weather radar image which solves the above described problems.

Therefore, the present invention proposed to offer an equipment for weather image prediction comprising a field extracting portion, which calculates for a plurality of frames, the velocity fields of local echoes with respect to time and space from a plurality of time sequential frames of weather radar images, and which segments and extracts a field possessing similar velocities with respect to time and space as one precipitation field from the above plurality of frames of weather radar images by employing the above calculated velocity fields, a moving velocity estimating portion, which estimates the moving velocity of a precipitation field by obtaining the amount of movement, among the neighboring frames, of the precipitation field segmented and extracted by the field extracting portion, and a forecast image generating portion, which extrapolates a plurality of precipitation fields by employing a distance taken by multiplying the moving velocity of the precipitation field estimated by the moving velocity estimating portion by a desired forecasting time, and which generates a forecast radar image by synthesizing the resulting image.

This equipment segments and extracts from a plurality of frames of weather radar images, a plurality of precipitation fields contained within a weather radar image based on the similarities of the locally calculated spatio-temporal velocity fields of the echoes, and stably and accurately estimates the moving velocity of the each of the precipitation fields, and performs a prediction, thereby making possible a weather radar image forecast of high accuracy.

In addition, the present invention proposed to offer a method for weather image prediction comprising a field extracting step, which calculates for a plurality of frames, the velocity fields of local echoes with respect to time and space from a plurality of time sequential frames of weather radar images, and which segments and extracts a field possessing similar velocities with respect to time and space as one precipitation field from the above plurality of frames of weather radar images by employing the above calculated velocity fields, a moving velocity estimating step, which estimates the moving velocity of a precipitation field by obtain in the amount of movement among the neighboring frames, of the precipitation field segmented and extracted by the field extracting step, and a forecast image generating step, which extrapolates a plurality of precipitation fields by employing a distance taken by multiplying the moving velocity of the precipitation field estimated by the moving velocity estimating step by a desired forecasting time, and which generates a forecast radar image by synthesizing the resulting image.

This method segments and extracts from a plurality of frames of weather radar images, a plurality of precipitation fields contained within a weather radar image based on the similarities of the locally calculated spatio-temporal velocity fields of the echoes, and stably and accurately estimates the moving velocity of the each of the precipitation fields, and performs a prediction, thereby making possible a weather radar image forecast of high accuracy.

Further, the present invention proposed to offer a computer readable recording medium recording a program for weather image prediction for execution on a computer comprising a field extracting step, which calculates for a plurality of frames, the velocity fields of local echoes with respect to time and space from a plurality of time sequential frames of weather radar images, and which segments and extracts a field possessing similar velocities with respect to time and space as one precipitation field from the above plurality of frames of weather radar images by employing the above calculated velocity fields, a moving velocity estimating step, which estimates the moving velocity of a precipitation field by obtaining the amount of movement, among the neighboring frames, of the precipitation field segmented and extracted by the field extracting step, and a forecast image generating step, which extrapolates a plurality of precipitation fields by employing a distance taken by multiplying the moving velocity of the precipitation field estimated by the moving velocity estimating step by a desired forecasting time, and which generates a forecast radar image by synthesizing the resulting image.

A user has this recording medium read by a computer, and by having the program executed, a process begins which segments and extracts from a plurality of frames of weather radar images, a plurality of precipitation fields contained within a weather radar image based on the similarities of the locally calculated spatio-temporal velocity fields of the echoes, and stably and accurately estimates the moving velocity of the each of the precipitation fields, and performs a prediction, thereby making possible a weather radar image forecast of high accuracy.

BRIEF DESCRIPTION OF THE DRAWINGS

FIGS. 6A–6C are diagrams illustrating the situation of the data process, and illustrate the computation of the velocity fields, the extraction of the precipitation fields, and the computation of the centroid position displacement, respectively.

FIGS. 9A–9C are diagrams illustrating the forecast images, the actual images, and the overlapped images according to the conventional method, respectively.

FIGS. 19A,19B are diagrams illustrating an example of the situation of the echoes and the precipitation field within a weather radar image.

DETAILED DESCRIPTION OF THE PREFERRED EMBODIMENTS OF THE INVENTION

Next, the preferred embodiments of the present invention will be explained with reference to drawings.

Figure 1:
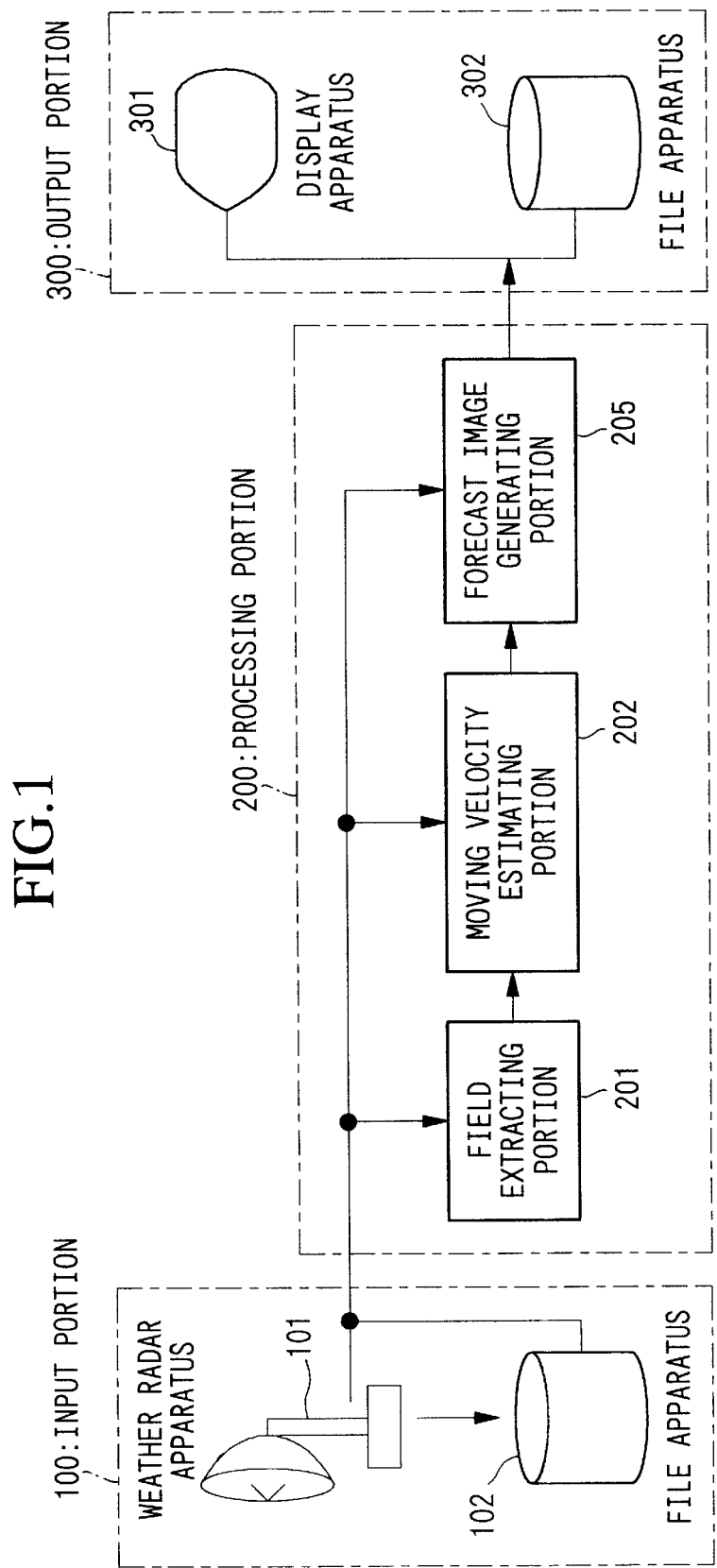
FIG. 1 is a structural diagram of an equipment for weather image prediction of the present invention.

FIG. 1 is a structural diagram of an equipment for weather image prediction of the present invention. The equipment for weather image prediction of the present invention is formed by an input portion 100, a processing portion 200, and an output portion 300.

The input portion 100 is formed by a weather radar apparatus 101 which inputs a time sequential weather radar image, and a file apparatus 102 which stores the weather radar images.

The processing portion 200 is formed by a field extracting portion 201, a moving velocity estimating portion 202, and a forecast image generating portion 205. The functions of each of the portions are as follows. The field extracting portion 201 calculates for a plurality of frames, the velocity fields of local echoes with respect to time and space from a plurality of time sequential frames of weather radar images, and segments and extracts a field possessing similar velocities with respect to time and space as one precipitation field from the above plurality of frames of weather radar images by employing the above calculated velocity fields. The moving velocity estimating portion 202 estimates the moving velocity of a precipitation field by obtaining the amount of movement among the neighboring frames, of the precipitation field segmented and extracted by the field extracting portion 201. And lastly, the forecast image generating portion 205 extrapolates a plurality of precipitation fields by employing a distance taken by multiplying the moving velocity of the precipitation field estimated by the moving velocity estimating portion by a desired forecasting time, and generates a forecast radar image by synthesizing the resulting image.

The output portion 300 is formed by a display apparatus 301 and a file apparatus 302 which displays and stores the generated forecast radar image.

A brief explanation of the operation of the equipment for weather image prediction of FIG. 1 is as follows.

First, a plurality of time sequential frames of weather radar images is inputted.

Then, the equipment for weather image prediction calculates for a plurality of frames, the velocity fields of local echoes with respect to time and space from the inputted plurality of time sequential frames of weather radar images, and segments and extracts a field possessing similar velocities with respect to time and space as one precipitation field from the above plurality of frames of weather radar images by employing the above calculated velocity fields.

Next, it estimates the moving velocity of a precipitation field by obtaining the amount of movement, among the neighboring frames, of the precipitation field segmented and extracted by the field extracting portion 201.

Then, it extrapolates a plurality of precipitation fields by employing a distance taken by multiplying the moving velocity of the precipitation field estimated by the moving velocity estimating portion by a desired forecasting time, and generates a forecast radar image by synthesizing the resulting image.

Lastly, it outputs the generated forecast radar image.

The equipment for weather image prediction illustrated in this FIG. 1 will be explained in detail according to each preferred embodiment.

(Preferred Embodiment 1)

Figure 2:
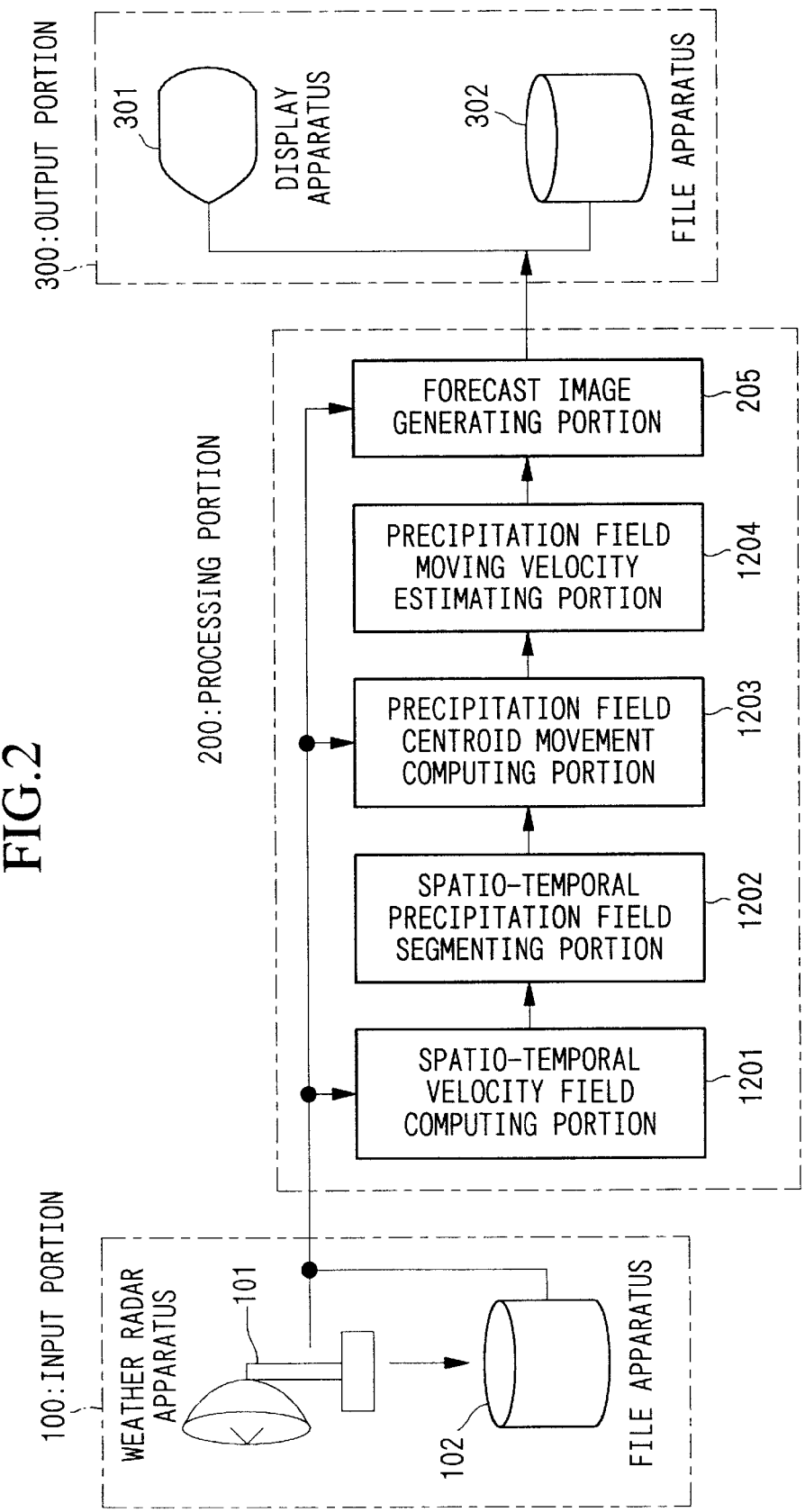
FIG. 2 is a structural diagram of an equipment for weather image prediction of the preferred embodiment 1 of the present invention.

FIG. 2 is a structural diagram of the equipment for weather image prediction of the preferred embodiment 1 of the present invention. Each of the portions of FIG. 2 which correspond to the portions of FIG. 1 use identical reference numerals.

The equipment for weather image prediction of the present preferred embodiment is formed by an input portion 100, a processing portion 200, and an output portion 300.

The input portion 100 is formed by a weather radar apparatus 101 which inputs a plurality of time sequential frames of weather radar images, and a file apparatus 102 which stores the weather radar images.

The processing portion 200 is formed by a spatio-temporal velocity field computing portion 1201 which calculates the velocity fields of local radar image echoes, a spatio-temporal precipitation field segmenting portion 1202 which segments the spatio-temporal area into precipitation fields based on the similarities among the velocity vectors, with respect to time and space, from within the calculated velocity fields, a precipitation field centroid movement computing portion 1203 which calculates the centroid position displacement of each of the obtained precipitation fields between the frames, a precipitation field moving velocity estimating portion 1204 which estimates the amount of movement of the precipitation fields based on the calculated centroid position displacement, and a forecast image generating portion 205 which performs parallel translation on the radar images based on the estimated moving velocity, and synthesizes each of the precipitation fields, and generates a forecast radar image.

Now, the correspondence of the processing portion 200 between FIG. 1 and FIG. 2 will be explained. The spatio-temporal velocity field computing portion 1201 and the spatio-temporal precipitation field segmenting portion 1202 corresponds to the field extracting portion 201 of FIG. 1. And the precipitation field centroid movement computing portion 1203 and the precipitation field moving velocity estimating portion 1204 corresponds to the moving velocity estimating portion 202 of FIG. 1 The output portion 300 is formed by a display apparatus 301 and a file apparatus 302 which displays and stores the generated forecast radar image.

Figure 3:
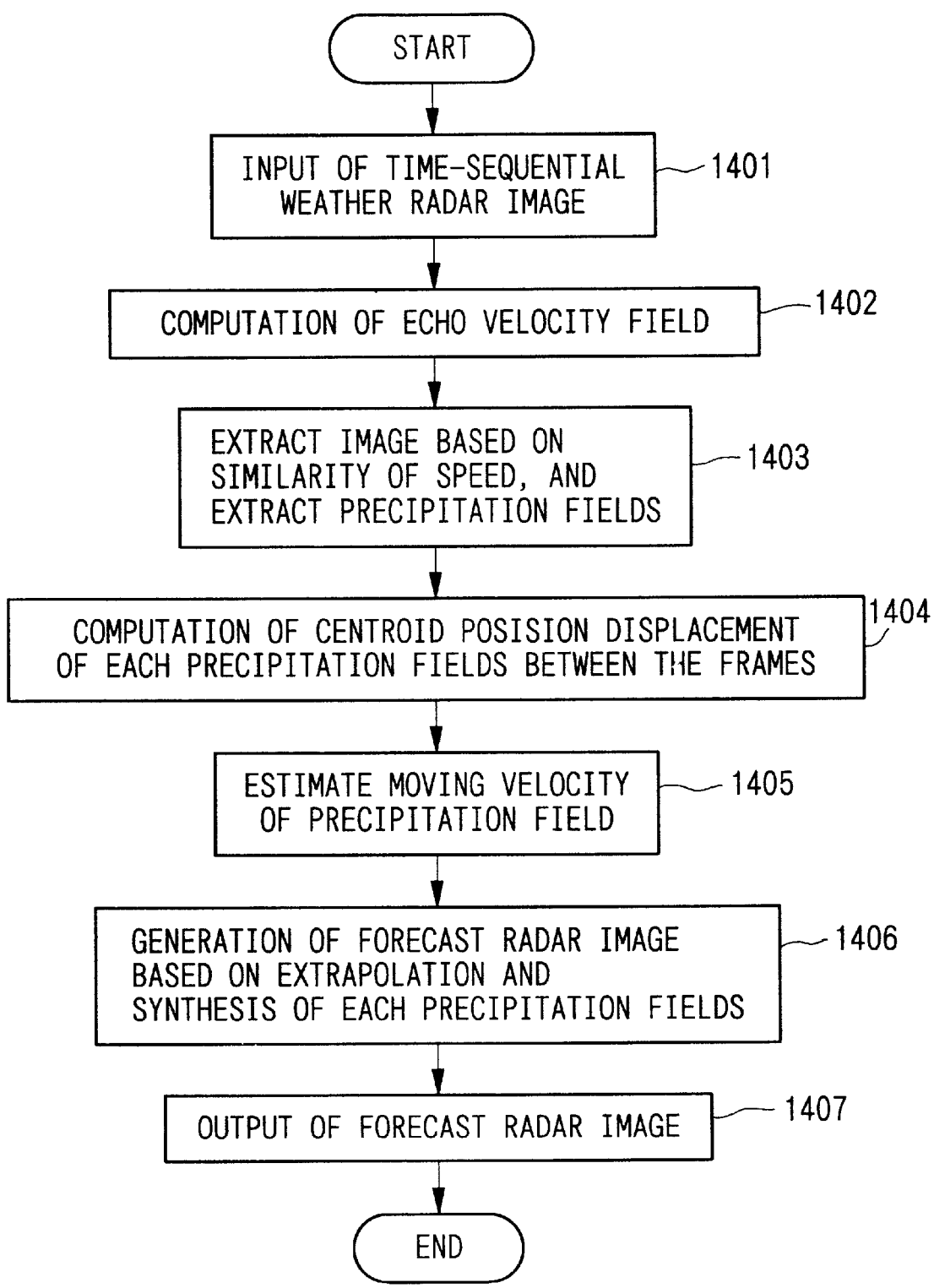
FIG. 3 is a flow chart illustrating the operation of the equipment for weather image prediction according to FIG. 2.

FIG. 3 is a flow chart illustrating the operations of the equipment for weather image prediction of FIG. 2. A plurality of time sequential frames of weather radar images is first inputted (step 1401), and then the velocity fields of the local radar image echoes are calculated with respect to time and space for a plurality of frames (step 1402). Then, the spatio-temporal area is segmented into precipitation fields based on the similarities among the velocity vectors, with respect to time and space, from within the velocity fields calculated at step 1402 (step 1403). Next, the centroid positions between the frames of each of the precipitation fields obtained at step 1403 are calculated, and their displacements are calculated (step 1404). Then, the moving velocities of precipitation fields carried by the precipitation fields are estimated based on the centroid position displacements calculated at step 1404 (step 1405). Next, with respect to the precipitation fields obtained at step 1404, the weather radar image is parallel translated by a distance taken by multiplying the moving velocity estimated at step 1405 by a desired forecasting time, and each of the precipitation fields are synthesized, and a forecast radar image is generated (step 1406). Lastly, the forecast radar image generated at step 1406 is outputted (step 1407).

Next, each portion of FIG. 2 will be explained in detail.

The spatio-temporal velocity field computing portion 1201 inputs from the input portion 100 the weather radar images $I_t$ where (t=0,1, . . . , T) of the time sequential T+1 frames, and the velocity vector $V_t$ (i, j) is calculated with respect to the adjacent frames $[I_{t-1}, I_t]$ where (t=1, 2, . . . , T) and respect to each of the blocks $B_t(i, j)$, where (i=i, 2, .

..., M; j=1, 2, ..., N), of the images which have been partitioned into a M×N number of blocks.

Figure 27:
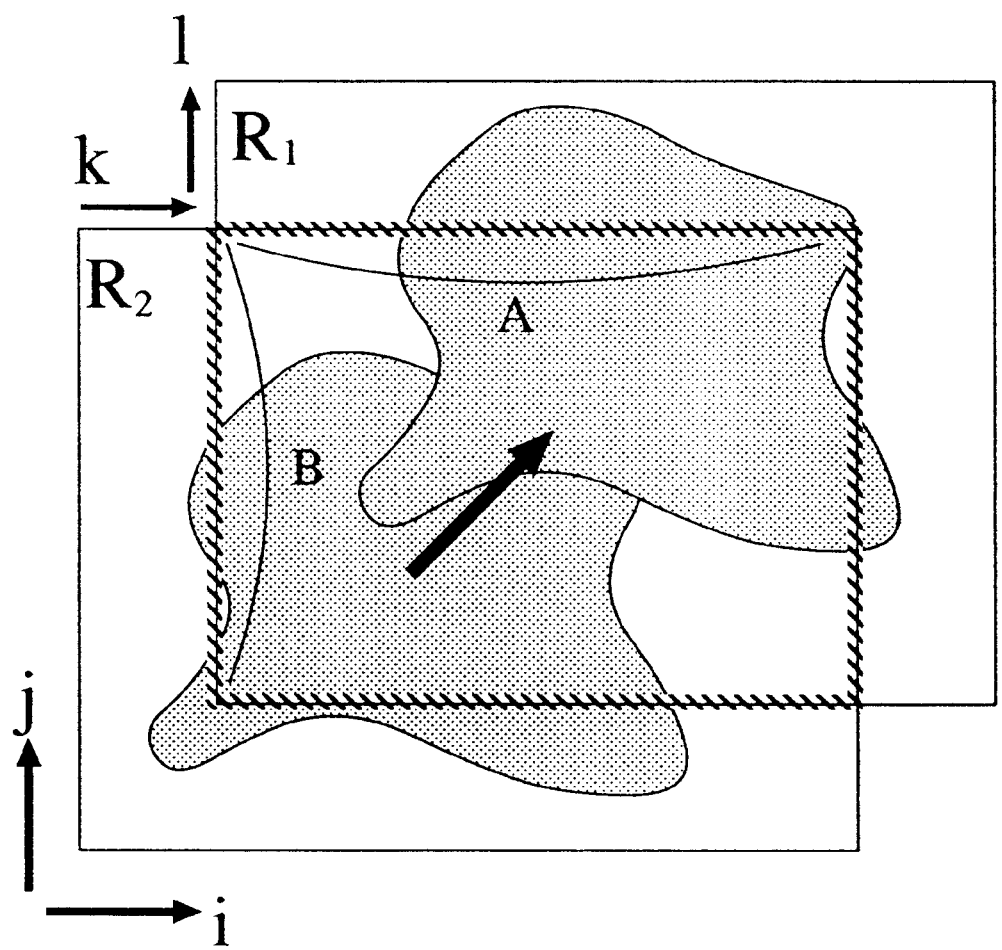
FIG. 27 is a diagram illustrating the situation of the process of the cross-correlation method.
Figure 28:
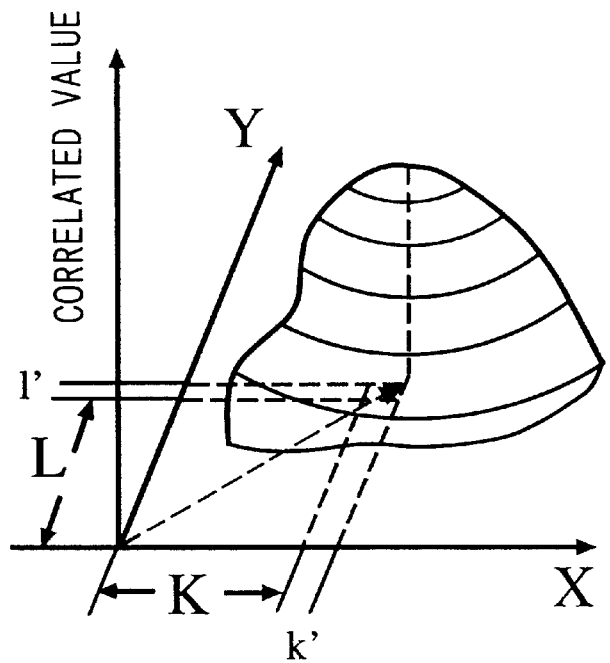
FIG. 28 is a diagram illustrating an example of the correlation value distribution obtained by the cross-correlation method.
Figure 29:
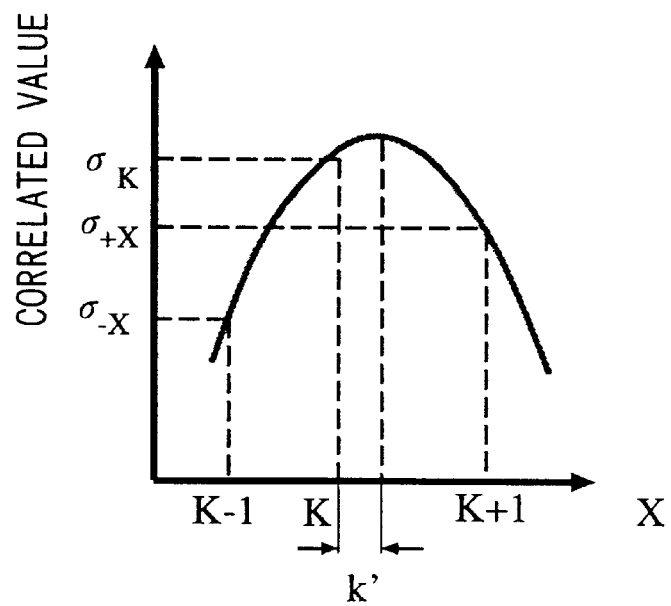
FIG. 29 is a diagram illustrating the method which calculates the point k' which takes the greatest value by way of a second order compensation from a correlation value distribution.
Figure 30A:
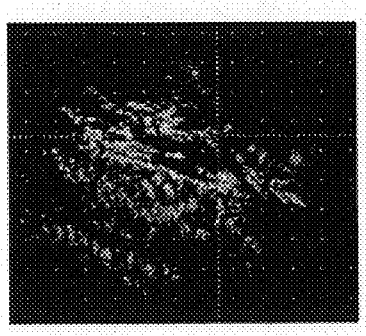
FIGS. 30A, 30B are diagrams illustrating the echoes within a weather radar image and the situation of the precipitation field, respectively.
Figure 30B:
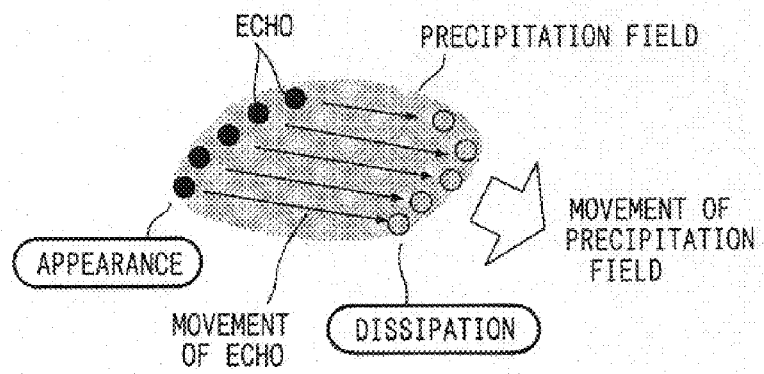

As an actual example, it is possible to employ the method which employs the cross-correlation coefficient of the gray level of the image, as explained in the related art Take the field within FIG. 27 as the block within the image for which the velocity is to be calculated. The velocity is calculated using equations (6) and (7). Employ this process for each block within the image as shown in FIG. 6A, and obtain the velocity fields between the frames. In addition, it is also possible to employ methods other than this particular method to calculate the velocity fields of time sequential images.

The spatio-temporal precipitation field segmenting portion 1202 inputs the velocity fields calculated by the spatio-temporal velocity field computing portion 1201, compares the velocity vectors of adjacent blocks with respect to space and time, and segments the fields so as to have the fields possessing similar velocities be part of the same precipitation fields.

Here, one actual example will be explained. First, as a measure of similarity between two velocity vectors $V_1=(v_{x1}, v_{y1})$ and $V_2=(v_{x2}, v_{y2})$, the average length of the two vectors and the ratio of the length of their difference vector $$l(V_1, V_2) = \frac{|V_1 - V_2|}{1/2 \cdot (|V_1| + |V_2|)} \tag{13}$$
$$= \frac{\sqrt{(v_{x1} - v_{x2})^2 + (v_{y1} - v_{y2})^2}}{1/2 \cdot \left(\sqrt{v_{x1}^2 + v_{y1}^2} + \sqrt{v_{x2}^2 + v_{y2}^2}\right)}$$

will be employed. And a function $S(V_1, V_2)$ will be defined to be 1 in the case the two vectors are similar, and 0 in the case they are not similar, as shown below, $$S(V_1, V_2) = 1 \text{ if } l(V_1, V_2) < TH_v \tag{14}$$

$$S(V_1, V_2) = 0 \text{ if } l(V_1, V_2) \geq TH_v \tag{15}$$

Here, $TH_v$ is a threshold value. It is also possible to use other standards such as the inner product of vectors.

Figure 4:
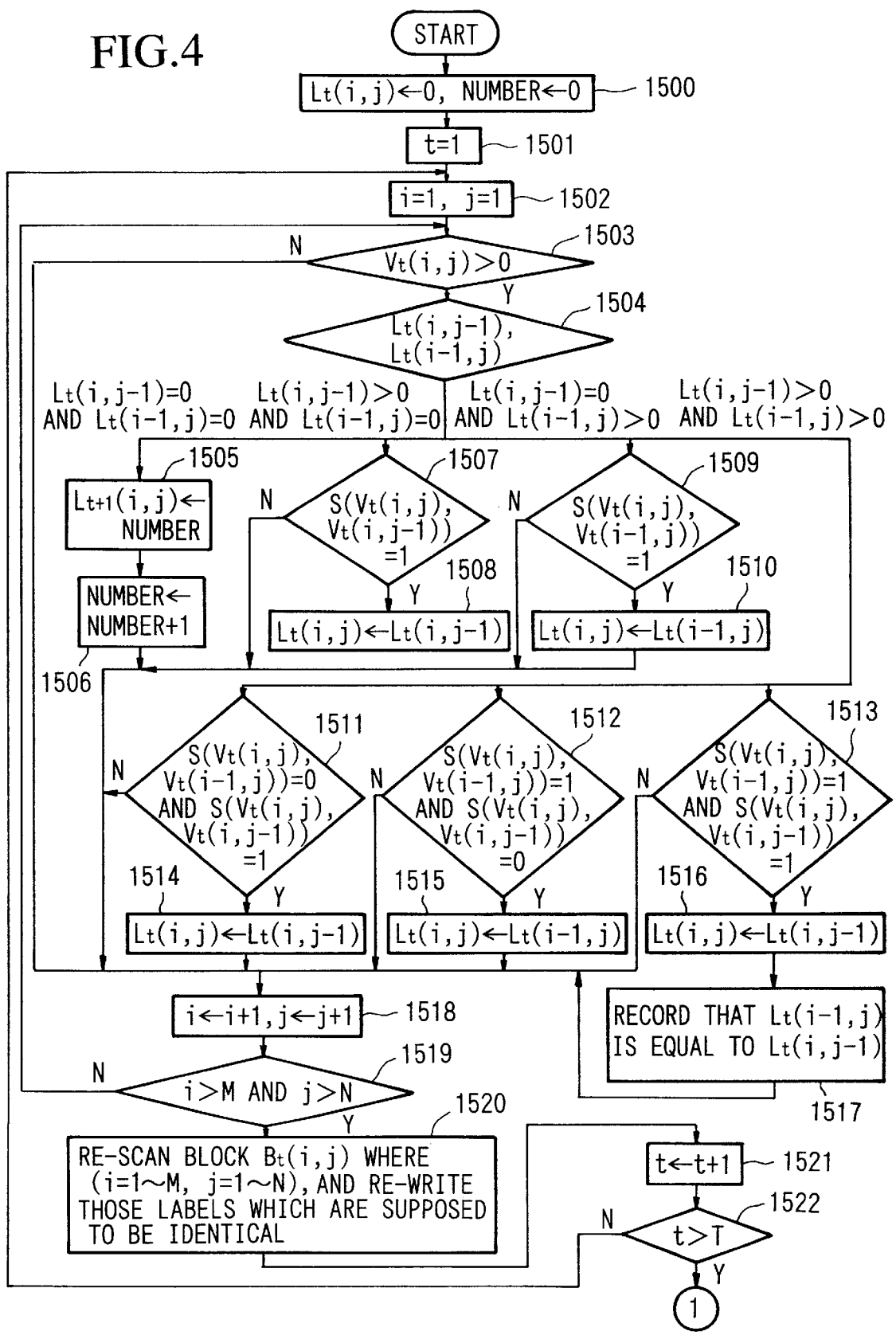
FIG. 4 is a flow chart illustrating the processes of the spatio-temporal precipitation field segmenting portion 1202.
Figure 5:
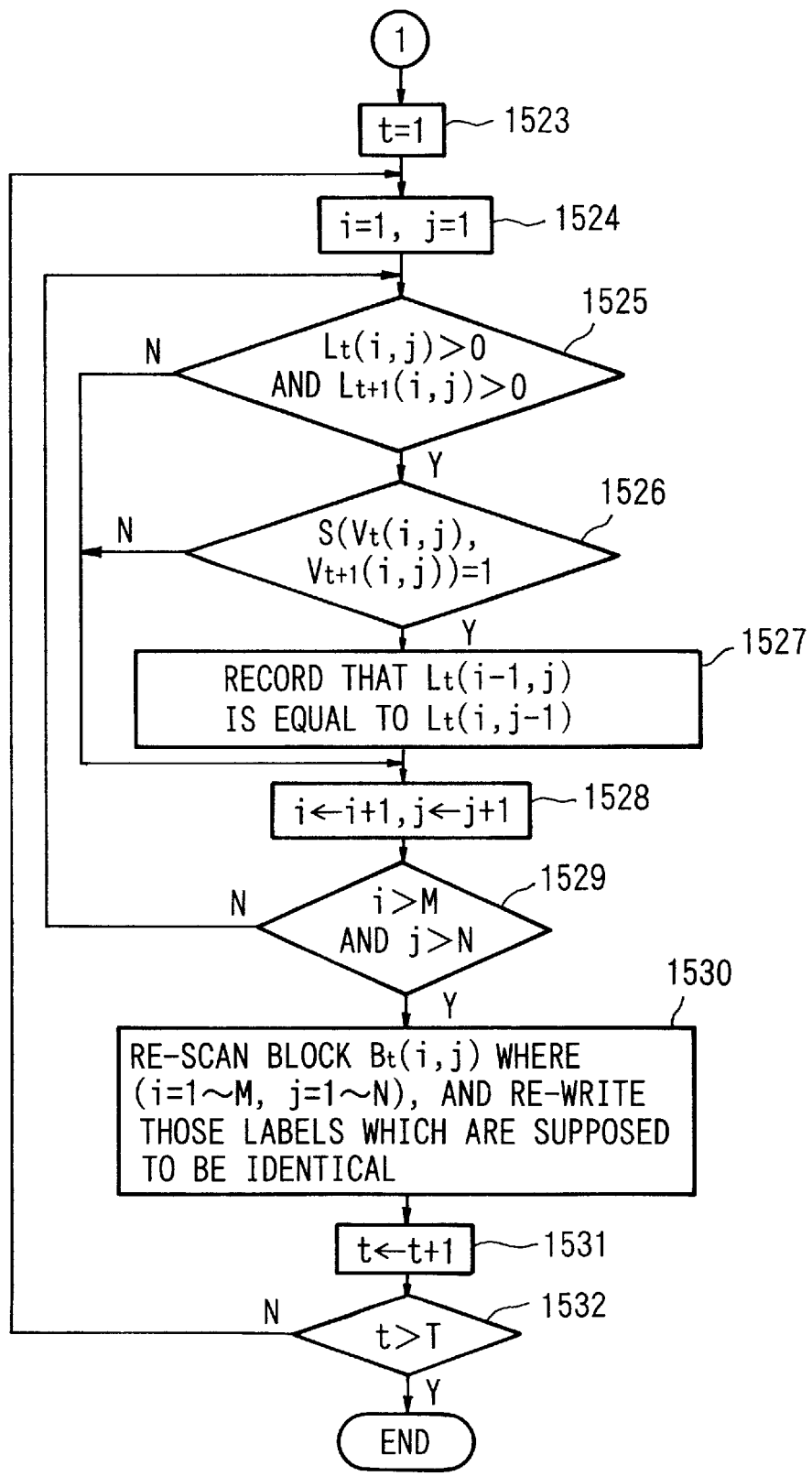
FIG. 5 is a flow chart illustrating the procsses of the spatio-temporal precipitation field segmenting portion 1202.

FIG. 4 and FIG. 5 are flow charts illustrating segmented processes of one actual example. Here, i and j are the x and y coordinates of the image block, t is the frame number, $B_t(i, j)$ is a block in frame t, $V_t(i, j)$ is a velocity vector of block $B_t(i, j)$, and $L_t(i, j)$ is a label for block $B_t(i, j)$. Here, by applying the same number label to adjacent blocks possessing similar velocities, the weather radar images can be segmented into precipitation fields.

The initial value of the label indicating the type of field is set to 0 for the labels $L_t(i, j)$, where (i=1, 2, ..., M; j=1, 2, ..., N; t=1, 2, ..., T) of all of the blocks, and the label counter Number is initialized as well (step 1500).

The frame number t is initialized (step 1501), and the coordinates i and j of the block are initialized (step 1502). The length of the velocity vector $V_t(i, j)$ of the block $B_t(i, j)$ is determined whether it is greater than 0 (step 1503). If it is greater than 0, then the labels of the two neighboring blocks ($B_t(i, j)$ right above and $B_t(i-1, j)$ to the left) are checked to see whether the labels are present or not (step 1504). In the case where neither labels are present ($L_t(i, j-1)=L_t(i-1, j)=0$), a new number is applied to the block $B_t(i, j)$ (step 1505), and the label counter Number is updated (step 1506). In the case where only one of the labels are present ($L_t(i, j-1)>0$ and $L_t(i-1, j)=0$, or $L_t(i, j-1)=0$ and $L_t(i-1, j)>0$), the velocity vector $V_t(i, j)$ of the block $B_t(i, j)$ is checked for the degree of similarity employing the function S with the velocity vector $V_t(i, j-1)$ or the velocity vector $V_t(i-1, j)$ which ever has the label present (step 1507, step 1509), and in the case where the two velocity vectors are determined to be similar (S=1), the label of block $B_t(i, j)$ is applied the identical label as that of the adjacent blocks $B_t(i, j-1)$ or $B_t(i-1, j)$ as shown by ($L_t(i, j)<. L_t(i, j-1)$ or $L_t(i, j)<. L_t(i-1, j)$) (step 1508, step 1510). In the case where the two vectors are not similar, block $B_t(i, j)$ is applied a new label. Moreover, in the case where both of the labels are present ($L_t(i, j-1)>0$ and $L_t(i-1, j)>0$), the velocity vector $V_t(i, j)$ of the block $B_t(i, j)$ is checked for the degree of similarity with the velocity vector $V_t(i, j-1)$ and the velocity vector $V_t(i-1, j)$ of blocks $B_t(i, j-1)$ and $B_t(i-1, j)$ (steps 1511, 1512, 1513). In the case where a similarity exists with only one of the velocity vectors of the blocks, the label of that block is applied (steps 1514, 1515). In the case where the velocity vector is not similar to either velocity vectors, a new label is applied. In the case where it is similar to both velocity vectors, the block $B_t(i, j)$ is applied an identical label as that of block $B_t(i, j-1)$ as shown by ($L_t(i, j)<. L_t(i, j-1)$) (step 1516). At this point, the fact that the label $L_t(i, j-1)$ is equal to the label $L_t(i-1, j)$ is recorded by a different means (step 1517).

The above process is performed on all of the blocks throughout the image (steps 1518, 1519), and afterwards, the labels which are recorded to be identical labels at step 1517 are re-written so as to be identical (step 1520).

In addition, an identical process is performed on the images of the below frames (steps 1521, 1522). During this process, the label numbers are numbered from the first precipitation field of the first frame down to the last precipitation field detected in the last frame. The label numbers are not reset at each new frame.

When the labeling is completed for each frame, an integrated process is performed between the frames. This process involves the scanning of all of the blocks $B_t(i, j)$ of frame t, where (i=1, 2, ..., M; j=1, 2, ..., N; t=1, 2, ..., T-1) in succession. In the case where a block with a label is found between the frames $L_t(i, j)>0$ and $L_{t+1}(i, j)>0$) (step 1525), the similarities of the velocity vectors these two blocks are checked (step 1526), and when they are considered to be similar, (S ($V_t(i, j), V_{t+1}(i, j)$) =1), the labels of the two blocks $L_t(i, j)$ and $L_{t+1}(i, j)$ are recorded to be equal by a different means (step 1527).

This process is performed on all of the blocks between all of the frames (steps 1523, 1524, 1528, 1529, 1531, 1532), and the labels which are supposed to be identical labels are re-written so as to be identical (step 1530). As a result, a field which has applied identical labels and possessing width with respect to time and space, can be obtained. This field is referred to as a precipitation field. A precipitation field may be considered to correspond to an actual precipitation field.

Further, those where the number of blocks forming the precipitation field which do not satisfy the standard value are eliminated as an abnormal precipitation field, thereby improving the stability.

With respect to each of the precipitation fields obtained by spatio-temporal precipitation field segmenting portion 1202, the precipitation field centroid movement computing portion 1203 calculates the amount of movement of the precipitation fields between the frames.

The following example may be considered as an actual example. When the weather radar image It (x, y) and the label $L_t(i, j)$ of a precipitation field is employed, the centroid of the precipitation field s of frame t can be calculated as the following.

$$Gx_t(s) = \frac{\sum_x \sum_y x \cdot m_t(s, x, y) \cdot I_t(x, y)}{\sum_x \sum_y m_t(s, x, y) \cdot I_t(x, y)} \qquad (16)$$

$$Gy_t(s) = \frac{\sum_x \sum_y y \cdot m_t(s, x, y) \cdot I_t(x, y)}{\sum_x \sum_y m_t(s, x, y) \cdot I_t(x, y)} \qquad (17)$$

$$m_t(s, x, y) = 1 \qquad (18)$$

in the case where (x, y) is included within block $B_t(i, j)$ $$m_t(s, x, y) = 1 \text{ in all other cases} \qquad (19)$$

Here, $m_t(s, x, y)$ is a mask which indicates the existence of the precipitation field s. (x, y) is the coordinate system of the image. (i, j) is the coordinate system of the block. The position (i, j) of the block coordinate system indicating the image coordinates of the center of the block is expressed as follows:

$$x = i \times \Delta x + O_x \qquad (20)$$

$$y = j \times \Delta y + O_y \qquad (21)$$

Here, ($\Delta x$, $\Delta y$) is the space between the blocks, and ($O_x$, $O_y$) is the offset from the origin of the coordinate system of the image. The range of a certain block (i, j) in the image coordinate is defined to be as follows:

$$\left(i \times \Delta x + O_x - \frac{\Delta x}{2}, j \times \Delta y + O_y - \frac{\Delta y}{2}\right) \sim \qquad (22)$$
$$\left(i \times \Delta x + O_x + \frac{\Delta x}{2} - 1, j \times \Delta y + O_y + \frac{\Delta y}{2} - 1\right)$$

The amount of displacement of the centroid position ($G_{xt}(s)$, $G_{yt}(s)$), where (t=1, 2, . . . , T; s=1, 2, . . . , L) between the frames is $$(Wx_t(s), Wy_t(s)) = (Gx_{t+1}(s) - Gx_t(s), Gy_{t+1}(s) - Gy_t(s)) \qquad (23)$$

when expressed as a vector.

The precipitation field moving velocity estimating portion 1204 inputs the displacement of the centroid position between the frames of each of the precipitation fields obtained by the precipitation field centroid movement computing portion 1203, and estimates the moving velocities of the appropriate precipitation fields.

The following method may be given as an example of that method. First, the average of the centroid movement (displacement) $W_s$, for the precipitation field s between the above described frames is calculated as the following.

$$W_s = (Wxt(s), Wyt(s)) = \frac{1}{T-1}\left(\sum_t Wx_t(s), \sum_t Wy_t(s)\right) \qquad (24)$$

Here, a threshold value $TH_v$ of a certain velocity is provided. When the magnitude of this average centroid movement velocity vector $|W_s|$ is greater than the threshold value $TH_T$, this precipitation field is determined to be mobile, and the estimated moving velocity ($U_x(s)$, $U_y(s)$) is made to be $W_s = (W_{xt}(s), W_{yt}(s))$. In addition, in the case where $|W_s|$ is within the threshold value $TH_T$, this precipitation field is determined to be immobile, and the estimated moving velocity is set as follows: ($U_x(s)$, $U_y(s)$)=0.

Moreover, it is possible to employ estimating methods other than the one described above.

With respect to each of the precipitation fields obtained through the spatio-temporal precipitation field segmenting portion 1202, in the forecast image generating portion 205, the radar image contained in the precipitation field is referred to as the forecast base image, and by parallel translation of this forecast base image according to the forecasting time by employing the moving velocity estimated by the precipitation field moving velocity estimating portion 1204, the forecast image of each of the precipitation fields are generated. And by synthesizing the images, the final forecast radar images to be outputted are obtained.

The following method will be explained as a preferred embodiment. Among the plurality of frames of the weather radar images used by the precipitation field centroid movement computing portion 1203, the most current image is employed as the forecast base image. The image $P_0(s)$ (x, y), which has removed the portion contained in the precipitation field s, is created. This image is referred to as the forecast base image.

The forecast image of the precipitation field s after τframes $P_{\delta T}(s)(x,y)$ is calculated using the following equation $$P_{\delta T}(s)(x,y) = P_o(s)(x - \tau \cdot U_x(s), y - \tau \cdot U_y(s)) \qquad (25)$$

employing the moving velocity ($U_x(s)$, $U_y(s)$) estimated by the precipitation field moving velocity estimating portion 1204. After all the precipitation fields s have calculated each of their forecast images $P_\tau(s)$, these images are synthesized. A method which, for the field where none of the plurality of precipitation fields overlap, determines the gray level of the forecast radar image by $$P(x, y) = \sum_s P_{\delta T}(s)(x, y) \qquad (26)$$

and which takes the result of the parallel translation or which, for the field where a plurality of precipitation fields overlap each other, takes the value of the precipitation field with the greatest gray level. Moreover, other methods may also be employed.

In the output portion 300, the display apparatus 301 displays the forecast radar image which is the output of the processing portion 200 and the velocity and such obtained through data processing. The file apparatus 302 stores the forecast radar image, the velocity, and such which are the results of the processes of the processing portion 200.

An example executing the above preferred embodiment will be explaining with reference to drawings.

Figure 7A:
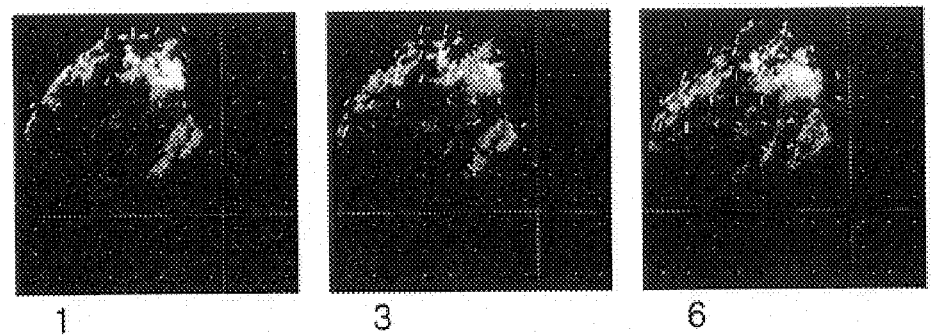
FIGS. 7A–7C are diagrams illustrating the velocity fields, the extracted precipitation field centroid positions, and the forecast base images according to the present preferred embodiment, respectively.
Figure 7B:
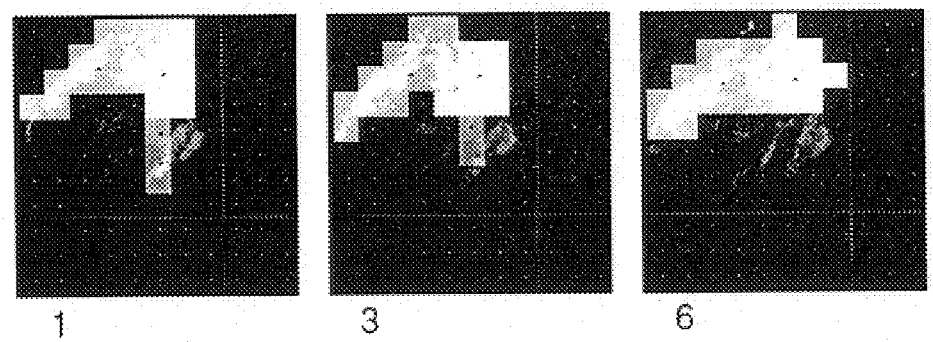
Figure 7C:
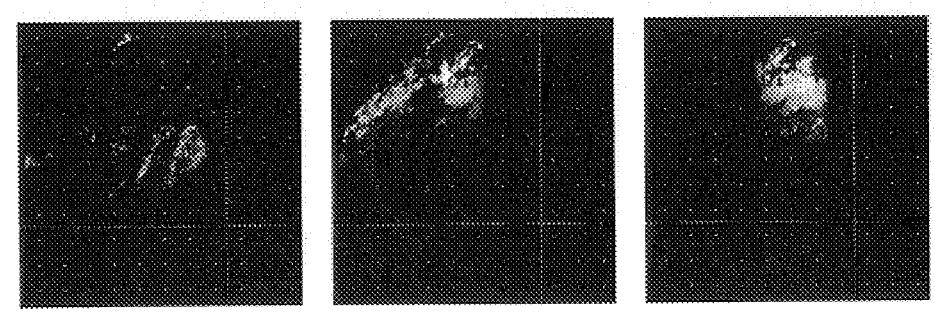

FIG. 7A is a diagram illustrating the first frame, the third frame, and the sixth frame from among six frames of weather radar images which are to be the source of the prediction, and the superimposed velocity vectors of each block calculated by the spatio-temporal velocity field computing portion 1201. FIG. 7B illustrates the precipitation field obtained by the spatio-temporal precipitation field segmenting portion 1202 through square fields with varying shades, and illustrates the centroid position of the echoes of the precipitation field by a black dot, and superimposes both items on the radar images. FIG. 7C illustrates the forecast base images corresponding to the three precipitation fields based on the forecast image generating portion 205.

Figure 8A:
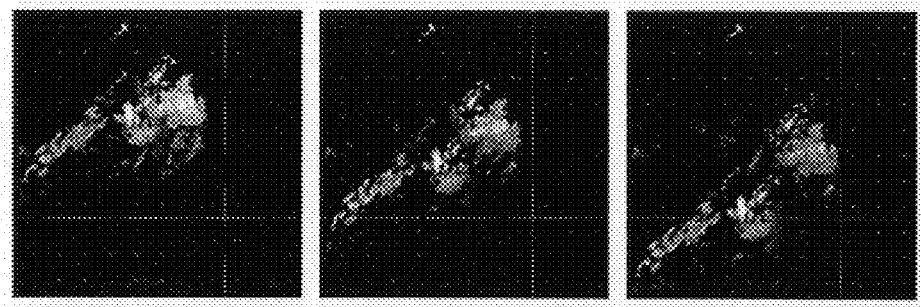
FIGS. 8A–8C are diagrams illustrating the forecast images, the actual images, and the overlapped images according to the present preferred embodiment, respectively.
Figure 8B:
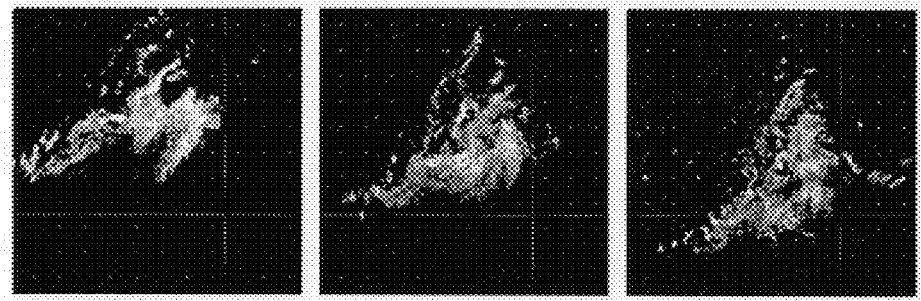
Figure 8C:
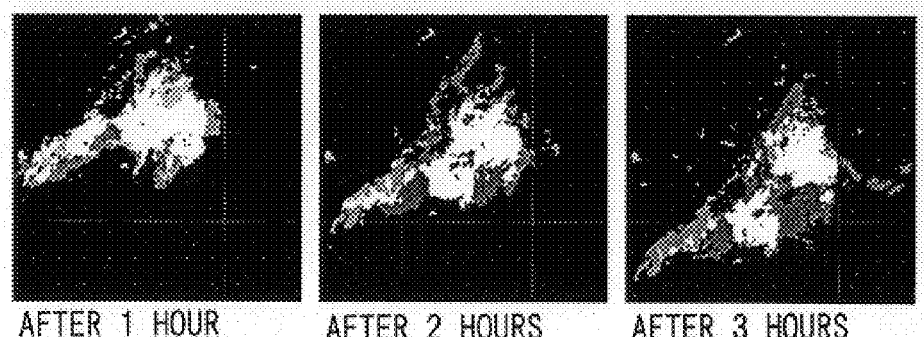

FIGS. 8A–8C are diagrams illustrating the forecast radar images obtained as a result of the processes illustrated in FIGS. 7A–7C above. FIG. 8A illustrates the forecast radar images after one hour, two hours, and three hours. FIG. 8B illustrates the actual radar images of the corresponding times. And FIG. 8C illustrates the fields where the forecasts were correct as white fields.

FIGS. 9A–9C illustrates the result of the radar image forecast performed at identical times as those of FIGS. 8A–8C based on the cross-correlation method which handles the weather radar image as a whole as indicated in the related art. As the result of the preferred embodiment of the present invention of FIGS. 8A–8C, FIG. 9A illustrates the forecast radar images after one hour, two hours, and three hours, and FIG. 9B illustrates the actual radar images of the corresponding times, and FIG. 9C illustrates the fields where the forecasts were correct as white fields.

When FIGS. 8A–8C are compared to FIGS. 9A–9C, since the results of the present invention performs the forecasting by estimating the moving velocities of a plurality of precipitation fields independently, it is possible to achieve a forecast image which is close to the actual image, while since, with the conventional method, the single moving velocity estimated for the echo as a whole is slower than that of the actual image, it is apparent that when a forecast is performed, there is a large difference from the actual image. This fact is clear from comparing the surface areas of the fields illustrated by the white color which indicates the correct fields, of FIG. 8C and FIG. 9C.

In this manner, it is apparent that it is possible to achieve, with the present invention, a forecast which has a higher accuracy than with the conventional method.

Furthermore, with the above preferred embodiment, although the spatio-temporal precipitation field segmenting portion 1202 compares the velocity vectors of adjacent blocks with respect to space and time, and segments the field so as to have fields possessing similar velocities be part of the same precipitation field, and although the precipitation field centroid movement computing portion 1203 calculated the amount of movement of the precipitation field between adjacent frames for each segmented fields (precipitation fields), it is not necessary to use adjacent blocks nor adjacent frames. In addition, although the forecast image generating portion 205 generated the forecast image employing the most current radar image, it is possible to generate a forecast image employing the results obtained from image generation or image processing based on a past or a current radar image.

The present invention may also be applied to solve problems of estimating the movement of objects whose patterns changes on the surface or inside the subject image which may be radar images different from the weather radar images, super soundwave images, sonar images, or such, or to solve problems of extracting and tracking a subject from a image with a large amount of noise.

Furthermore, the precipitation field moving velocity estimating portion 1204 described above performs the forecasting with the global moving velocities employing the centroid movement obtained by the precipitation field centroid movement computing portion 1203, regardless of the prediction lead time which is the forecasting time requested at the forecast image generating portion 205. In the case where the prediction lead time is within the standard time, the moving velocity of the precipitation field is forecasted by employing the representative value of the velocity of the local echo of the field contained in the precipitation field s and by using the velocity field obtained from the spatio-temporal velocity field computing portion 1201. And in the case where the prediction lead time falls after the standard time, the forecasting may be performed using the global moving velocities as described above. This is because, in the case where the prediction lead time is extremely short, there is a tendency for a uniform parallel translation due to the small amount of appearances, dissipations, and deformations of the echoes, and by generating a forecast image at the forecast image generating portion 205 by employing the local moving velocities of the echoes, it is possible to improve the critical success index of a short term forecast. Furthermore, it may desirable to define the above mentioned standard time according to the region and the season.

As explained above, the input portion 100 inputs the weather radar images obtained from a weather radar, saves these images in a file recording apparatus, and transmits weather radar images of an arbitrary time depending on the requests from the spatio-temporal velocity field computing portion 1201, the precipitation field centroid movement computing portion 1203, and the forecast image generating portion 205.

The spatio-temporal velocity field computing portion 1201 calculates for each of the plurality of small fields within the weather radar image segmented into blocks, the moving velocities of the echoes between frames I (k−1), I (k) where (k=1, 2, . . . , T), with respect to the T+1 frames of the weather radar images (I (t), where t=0, 1, 2, . . . , T) inputted at the input portion 100 (please refer to FIG. 6A). In this manner, the velocity field of the echoes of T frames can be calculated.

In the cross-correlation method explained in the related art, since the velocity is estimated from the gray level of a wide field within the image, there was a problem where the appearances, dissipations, deformations and such of the echoes has an influence on the estimated velocity, thereby making the estimated velocity unstable and inaccurate. With respect to that, the spatio-temporal velocity field computing portion 1201, by calculating the local velocity vectors for each block, can divisionally calculate the abnormal velocity vectors due to the appearances, dissipations, deformations and such of the echoes. However, since their influences are confined within the blocks, it is possible to estimate a stable velocity of the echoes as a whole.

The spatio-temporal precipitation field segmenting portion 1202 defines the blocks possessing velocities which are similar with respect to time and space as a single precipitation field by employing the spatio-temporal velocity fields calculated by the spatio-temporal velocity field computing portion 1201, and performs the segmenting and the extracting of the image fields (please refer to FIG. 6B). The fields possessing spatio-temporal width obtained in this manner is referred to as precipitation fields.

One method of segmenting is offered here. When the velocity vectors of two adjacent blocks are sufficiently close, the two blocks will be included in the same field. Repeating this process for all of the fields within the image, for all of the frames, is one possible method. In this case, since there is only a comparison between adjacent blocks, even when a precipitation field has a velocity which gradually changes with respect to space, it is possible of extracting a single continuous precipitation field.

In addition, unstable elements such as appearances and dissipations would produce vectors with a direction different from its surroundings and with abnormal lengths. It is possible to extract only the stable precipitation field excluding these abnormalities.

As for a method to segment and extract an image, as opposed to a method based on the gray level of the image, since the fields with similar echo moving velocities are treated as one precipitation field, it is possible to segment and extract a precipitation field which is very close to the actual weather phenomenon.

Furthermore, as opposed to the method explained in the related art which handles the entire field of the weather radar image as one cell, even when a precipitation phenomenon possessing a plurality of differing movements is present within the weather radar image, the present invention is able to segment the field and handle those fields separately, leading to a forecast of very high accuracy.

The precipitation field centroid movement computing portion 1203 calculates the is centroid position of the echoes within the image of each frame for the precipitation fields obtained by the spatio-temporal precipitation field segmenting portion 1202, and calculates the centroid position displacement between the frames (please refer to FIG. 6C). Since the spatio-temporal precipitation field segmenting portion 1202 uses precipitation fields, which have the unstable elements such as appearances and dissipations removed, it is possible to obtain a stable movement of the centroid.

The precipitation field moving velocity estimating portion 1204 estimates the moving velocity of the precipitation field based on the displacement of the centroid position of the echoes between the frames from the precipitation fields calculated by the precipitation field centroid movement computing portion 1203.

The following is an example of a method which may be employed to accomplishes the above. First, the sum of the displacement of the centroid position between the frames is taken. In the case where that velocity exceeds a certain fixed value, the precipitation field is determined to be mobile, and the estimated moving velocity is set to be the average value of the displacement of the centroid position between the frames divided by time interval between the frames. In the case where the velocity does not exceed the fixed value, that precipitation field is determined to be immobile, and the estimated moving velocity is set to 0.

With respect to each of the precipitation fields obtained through the spatio-temporal precipitation field segmenting portion 1202, in the forecast image generating portion 205, the weather radar image which is to be the image base for the forecast contained in the precipitation field is referred to as the forecast base image, and by the estimated moving velocity of the precipitation field obtained by the precipitation field moving velocity estimating portion 1204 according to the desire forecasting time, for example, generating a forecast image by parallel translation, and further by synthesizing each of the forecast images for a plurality of precipitation fields, a forecast radar image can be generated.

In the present invention, the spatio-temporal precipitation field segmenting portion 1202 segments the weather radar images of a plurality of frames into precipitation fields based on the spatio-temporal similarities of the moving velocities of the echoes calculated by the spatio-temporal velocity field computing portion 1201. The precipitation field centroid movement computing portion 1203 calculates the movement of the centroid position of the precipitation fields segmented and extracted by the spatio-temporal precipitation field segmenting portion 1202 between a plurality of frames, and based on this, the precipitation field moving velocity estimating portion 1204 estimates the moving velocities of the precipitation fields. For this reason, influences from unstable phenomena such as appearances and dissipations are reduced, and it is possible to estimate moving velocities for a plurality of precipitation fields which are close to the movement of the actual precipitation fields. The forecast image generating portion 205 forecasts a plurality of precipitation fields independently for the precipitation fields segmented and extracted by the spatio-temporal precipitation field segmenting portion 1202 by employing the moving velocities estimated by the precipitation field moving velocity estimating portion 1204, and by synthesizing this, generates a forecast radar image. By this means, when compared to the method which handles the entire field of the radar image as one cell such as the cross-correlation method, the present method is able to perform a forecast which is very close to the actual phenomenon.

According to the above, it is possible for a highly accurate forecast of a weather image which is an objective of the present invention.

As explained above, the present invention segments and extracts a plurality of precipitation fields contained within weather radar images based on the similarities of the spatio-temporal velocity fields of the echoes calculated locally from the weather radar images of a plurality of frames, and stably and accurately estimates the moving velocities of each of the precipitation fields. Consequently, there is the effect of having a highly accurate image forecast of a weather radar image.

(Preferred Embodiment 2)

Figure 10:
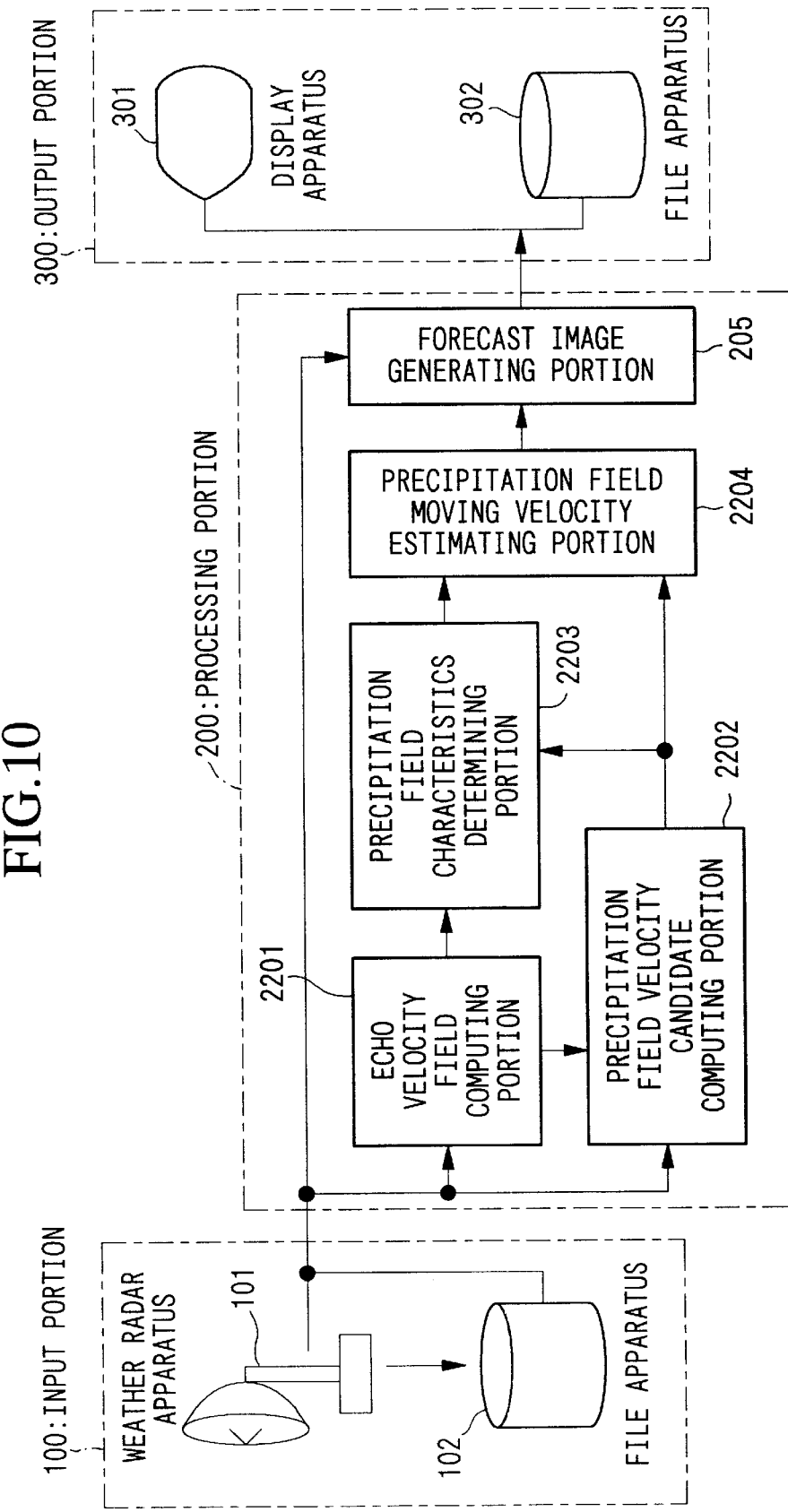
FIG. 10 is a structural diagram of an equipment for weather image prediction of the preferred embodiment 2 of the present invention.

FIG. 10 is a structural diagram of an equipment for weather image prediction of the preferred embodiment 2 of the present invention. Each of the portions of FIG. 10 which have correspondence to the portions of FIG. 1 uses identical reference numerals.

The equipment for weather image prediction of the present preferred embodiment is formed by an input portion 100, a processing portion 200, and an output portion 300.

The input portion 100 is formed by a weather radar apparatus 101 and a file apparatus 102 which stores weather radar images.

The processing portion 200 is formed by an echo velocity field computing portion 2201 which calculates the local velocity of the echoes of the weather radar images, a precipitation field velocity candidate computing portion 2202 which obtains the precipitation fields within the weather radar images, and calculates the velocity candidate of these precipitation fields, a precipitation field characteristics determining portion 2203 which determines the characteristics of the precipitation fields (the immobility or the mobility of the precipitation fields) from the candidate velocities of the precipitation fields and the local velocity fields of the echoes, a precipitation field moving velocity estimating portion 2204 which determines the velocity of the precipitation fields from the candidate velocities of the precipitation fields and the degree of immobility or mobility of the precipitation fields which is the determined characteristics of the precipitation fields, and a forecast image generating portion 205 which generates the forecast images by employing the determined moving velocities of the precipitation fields.

The following is an explanation of the correspondence between the processing portion 200 of FIG. 1 and that of FIG. 10. The processes of the echo velocity field computing portion 2201 and the precipitation field velocity candidate computing portion 2202 which extract precipitation fields from the images correspond to the field extracting portion 201 of FIG. 1. And, the processes of the precipitation field velocity candidate computing portion 2202 which calculates the velocity candidates of the precipitation fields and the precipitation field characteristics determining portion 2203 and the precipitation field moving velocity estimating portion 2204 correspond to the moving velocity estimating portion 202 of FIG. 1.

The output portion 300 is formed by a display apparatus 301 and a file apparatus 302 which displays and stores the generated forecast radar images.

Figure 11:
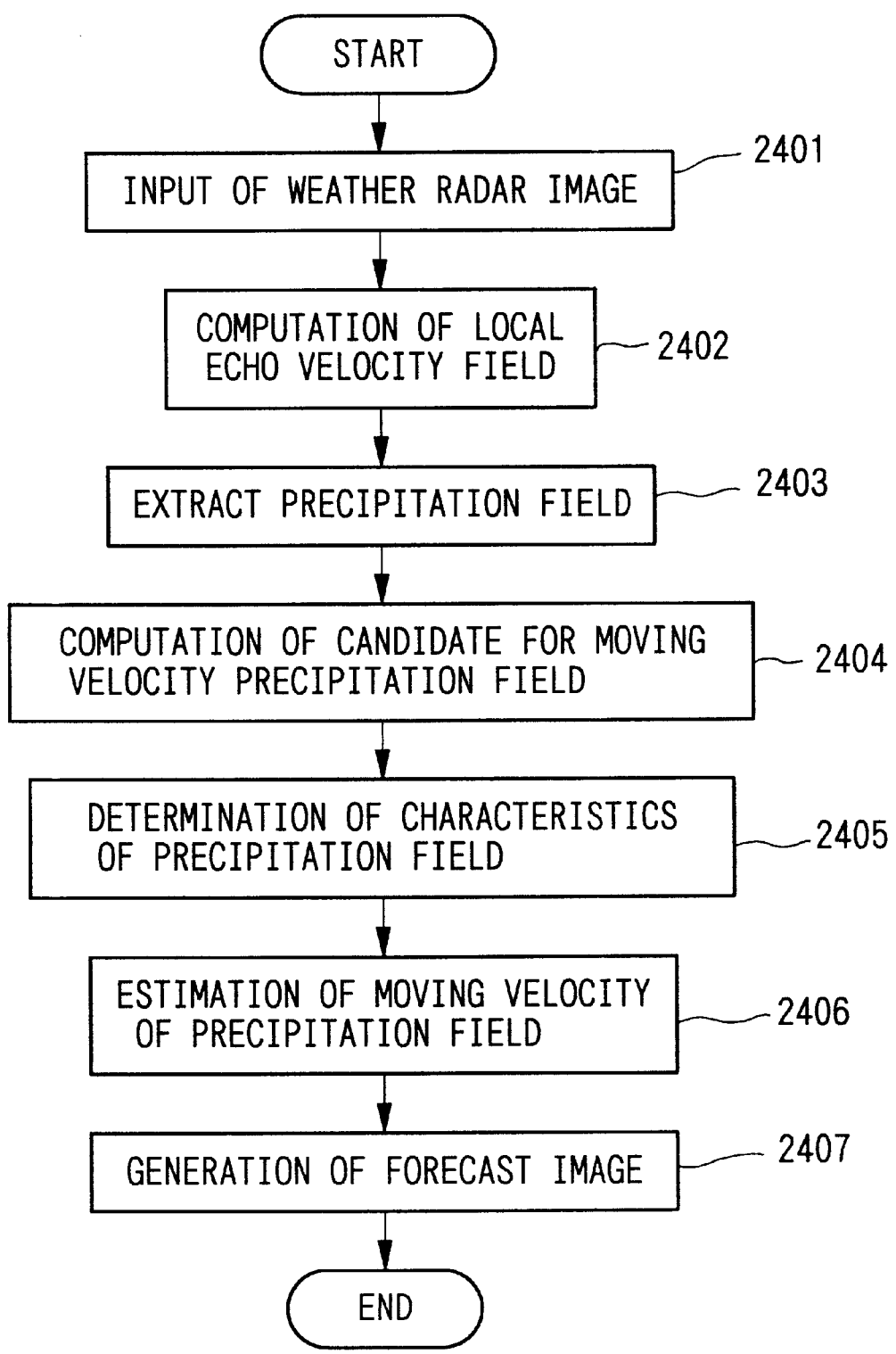
FIG. 11 is a flow chart illustrating the operation of the equipment for weather image prediction according to FIG. 10.

FIG. 11 is a flow chart illustrating the operation of the equipment for weather image prediction of FIG. 10. The weather radar images are inputted (step 2401), the local velocity fields of the echoes are calculated (step 2402), and separate precipitation fields are extracted from the weather radar images (step 2403). With respect to each of those precipitation fields, the candidates for the moving velocities are calculated (step 2404) and the degree of immobility or mobility is determined for each of the precipitation fields from the local velocity fields of the echoes and the candidate moving velocities of the precipitation fields. Then, from the degree of immobility or mobility and the candidate moving velocities of the precipitation fields, the moving velocities of the precipitation fields are estimated which will be employed in the forecast (step 2406), and the forecast images are generated by employing the estimated moving velocities of the precipitation fields (step 2407).

Next, each of the portions of the processing portion 200 will be explained in detail.

The echo velocity field computing portion 2201 inputs the weather radar images $I_t$ where (t=0, 1, ..., T) of the time sequential T+1 frames from the weather radar apparatus 101, and with respect to the adjacent frames $[I_{t-1}, I_t]$ where (t=1, 2, ..., T), the local velocity vector $V_t$ (i, j) of the echoes are calculated for each of the blocks $B_t$ (i, j), where (i=1, 2, ..., M; j=1, 2, ..., N), of the images which have been partitioned into M×N blocks.

In the actual example, it is possible to use the method employed in the cross-correlation method of the image gray level.

Figure 12:
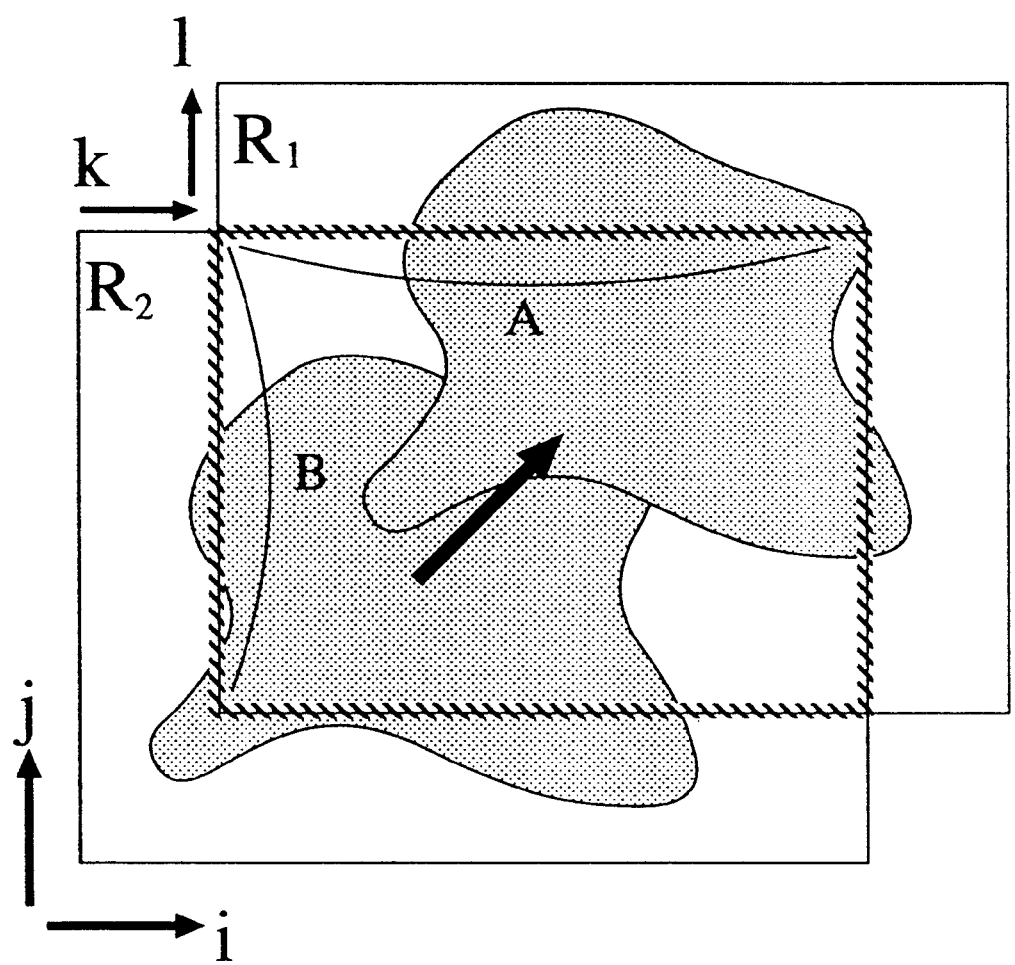
FIG. 12 is a diagram illustrating the situation of the process of the cross-correlation method.

Now, employing weather radar images $R_1$, $R_2$ which centrally position blocks $B_t$ (i, j) and $B_{t-1}$ (i, j) from the adjacent frames, receptively, the cross-correlation coefficient of the images is calculated by shifting one of images $R_2$ (please refer to FIG. 12).

$$\sigma_{k,l} = \frac{\sum_{i=1}^{A}\sum_{j=1}^{B} R_1(i,j) R_2(i+k, j+l) - AB\overline{R_1 R_2}}{\sqrt{\left(\sum_{i=1}^{A}\sum_{j=1}^{B} R_1(i,j)^2 - AB\overline{R_1}^2\right)\left(\sum_{i=1}^{A}\sum_{j=1}^{B} R_2(i,j)^2 - AB\overline{R_2}^2\right)}} \quad (101)$$

$$\overline{R_1} = \frac{\sum_{i=1}^{A}\sum_{j=1}^{B} R_1(i,j)}{AB} \quad (102)$$

$$\overline{R_2} = \frac{\sum_{i=1}^{A}\sum_{j=1}^{B} R_2(i+k, j+l)}{AB} \quad (103)$$

The shift between the two weather radar images $R_1$, $R_2$ is made to be (k, l) when calculating the correlation value and the fields A, B which are to be correlated Cm FIG. 12, the oblique lines indicate the field to be correlated, and the bold arrow in the center shows the direction of the movement of the echo pattern).

In addition, the velocity vector of the echo may be calculated as follows:

$$V_x = \frac{K}{\Delta t} \quad (104)$$

$$V_y = \frac{L}{\Delta t} \quad (105)$$

from the shift width (K, L) of the greatest correlation value. Here, $v_x$ and $V_y$ indicate the x component and the y component, and $\Delta t$ expresses the time interval of measured times of the radar images.

By performing this type of calculation for each of the blocks, the local velocity fields of the echoes are calculated.

It is also possible to use methods other than the one described above.

The precipitation field velocity candidate computing portion 2202 obtains the velocity candidate of the precipitation fields within the weather radar images. A method to extract from within the image a single precipitation field possessing similar velocities by employing the local velocities of the echoes obtained by the echo velocity field computing portion 2201, and to calculate the velocity candidate of the precipitation fields from the displacement of the centroid between the frames, is illustrated as an example.

First, using the velocity fields calculated by the echo velocity field computing portion 2201 as an input, the velocity vectors of adjacent blocks are compared with respect to space and time, and the fields are segmented so as to have fields possessing similar velocities be part of the same field. This process is identical to the process of the spatio-temporal precipitation field segmenting portion 1202 of the preferred embodiment 1, and this process will be briefly explained below.

Here, as a measure of similarity between two velocity vectors $V_1=(v_{x1}, v_{y1})$ and $V_2=(v_{x2}, v_{y2})$ of two adjacent blocks, the average length of the two vectors and the ratio of the length of their difference vector $$l(V_1, V_2) = \frac{|V_1 - V_2|}{1/2 \cdot (|V_1| + |V_2|)} \quad (106)$$

$$= \frac{\sqrt{(v_{x1} - v_{x2})^2 + (v_{y1} - v_{y2})^2}}{1/2 \cdot \left(\sqrt{v_{x1}^2 + v_{y1}^2} + \sqrt{v_{x2}^2 + v_{y2}^2}\right)}$$

are employed. And a function S ($V_1$, $V_2$) will be defined to be 1 in the case the two vectors are similar, and 0 in the case they are not similar, as shown below, $$S(V_1, V_2)=1 \text{ if } l(V_1, V_2) < TH_v \quad (107)$$

$$S(V_1, V_2)=0 \text{ if } l(V_1, V_2) \geq TH_v \quad (108)$$

Here, $TH_v$ is a threshold value. It is also possible to use other standards such as the inner product of vectors as a method to calculate similarities.

Next, with respect to each of the blocks within the image, the label $L_t$ (i, j) which indicates the type of precipitation field, is prepared, and the blocks are scanned in a raster-like pattern, and the group of blocks whose echo velocities are similar to the adjacent blocks are applied an identical label. As a result of this type of labeling process, the distribution of the precipitation fields may be obtained as fields possessing identical label $L_t$ (i, j) numbers.

Furthermore, with respect to the groups of blocks possessing identical label numbers (this will simply be referred to as precipitation fields), the moving velocity of the each of the precipitation fields between the frames are calculated from the displacement of the centroids.

The centroid ($G_{xt}(s)$, $G_{yt}(s)$) of the precipitation field s of frame t is calculated as follows:

$$Gx_t(s) = \frac{\sum_x \sum_y x \cdot m_t(s, x, y) \cdot I_t(x, y)}{\sum_x \sum_y m_t(s, x, y) \cdot I_t(x, y)} \quad (109)$$

-continued $$Gy_t(s) = \frac{\sum_x \sum_y y \cdot m_t(s, x, y) \cdot I_t(x, y)}{\sum_x \sum_y m_t(s, x, y) \cdot I_t(x, y)} \quad (110)$$

$m_t(s, x, y) = 1$ (111)
in the case where $(x, y)$ is included within block $B_t(i, j)$ $m_t(s, x, y) = 0$ in all of the other cases (112)

Here, $m_t$ (s, x, y) indicates the existence of the precipitation field s. (x, y) is the coordinate system of the image. (i, j) is the coordinate system of the blocks. Then, the displacement of the centroid position between the frames is obtained with the following equation.

$$W_t(Wx_t(s), Wy_t(s)) = (Gx_{t+1}(s) - Gx_t(s), Gy_{t+1}(s) - Gy_t(s)) \quad (113)$$

In addition, the candidate velocity of the individual precipitation fields may be calculated as the average of the centroid displacement between the frames as follows:

$$W(s) = (Wx_s, Wy_s) = \frac{1}{T-1}\left(\sum_t Wx_t(s), \sum_t Wy_t(s)\right) \quad (114)$$

It is also possible to use calculating methods of the moving velocities of the precipitation fields other than the method described above.

The precipitation field characteristics determining portion 2203 determines the degree of mobility or immobility which is characteristics of the movement of the precipitation fields by the local velocity fields of the echoes obtained by the echo velocity field computing portion 2201 and the moving velocity candidates of the precipitation fields obtained by the precipitation field velocity candidate computing portion 2202.

The following is a standard when determining the degree of mobility or immobility. By employing a standard which has a precipitation field be mobile in the case where the local velocities of the echoes and the moving velocities of the precipitation fields are similar in terms of direction and magnitude, the degree of mobility or immobility is calculated from the similarities between each of the velocity vectors.

Figure 13:
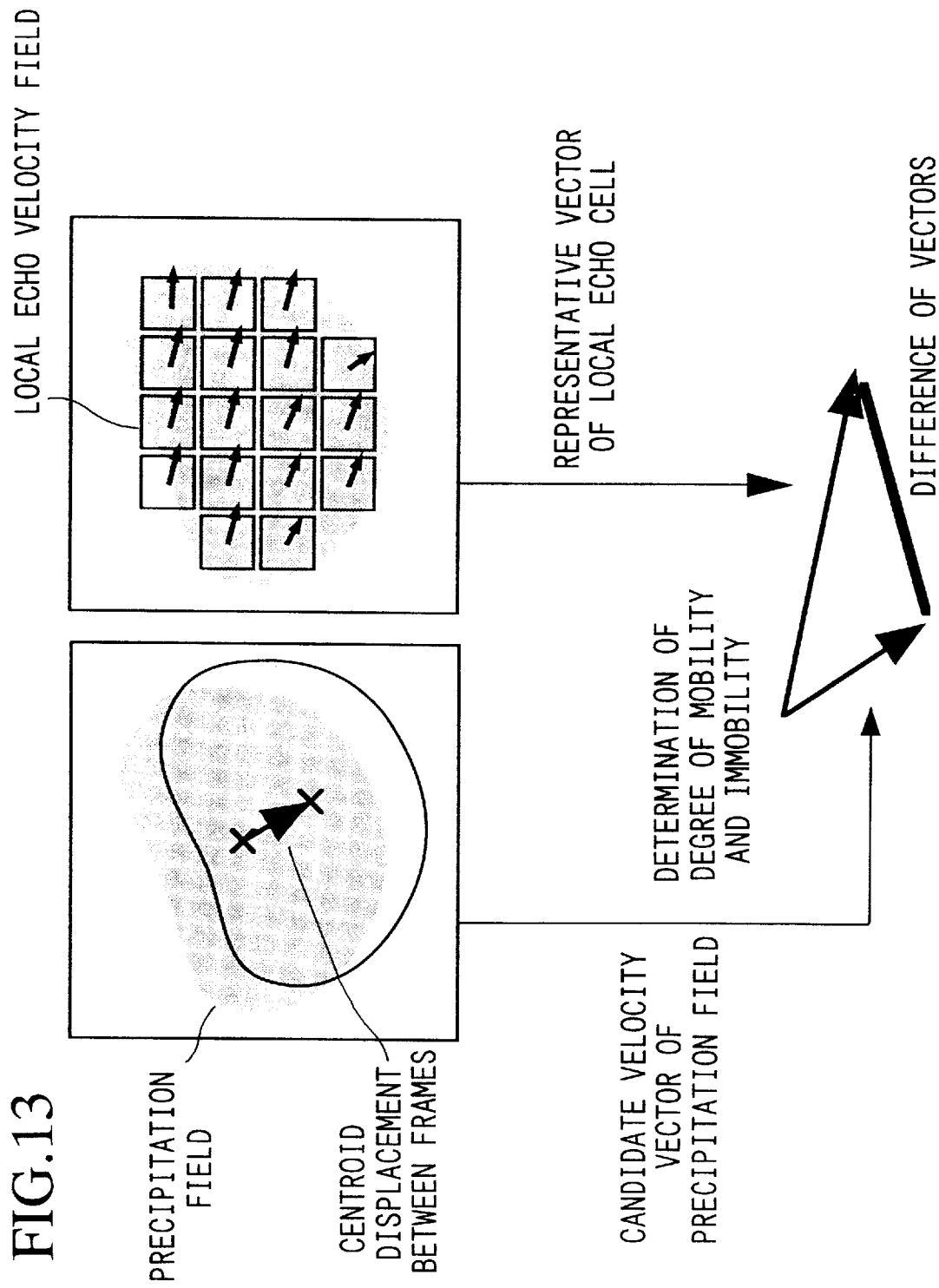
FIG. 13 is a diagram illustrating the situation of the determining of the degree of mobility and immobility of the precipitation field.

As a concrete example, the average value of the velocity $V_t$ (i, j) is employed as a representative value $\overline{V}(s)$ of the velocity of the echo of the field contained in the individual precipitation fields s from the velocity fields of the echoes obtained by the echo velocity computing portion 2201. Also, the most frequent value may be used in addition to the average value. By employing the representative value vectors $\overline{V}(s)$ of the velocities of the local echoes and the candidate moving velocity vectors $W(s)$ of the precipitation fields calculated by the precipitation field velocity candidate computing portion 2202, the degree P of the mobility or immobility of the precipitation fields is calculated by the equation $$P = \frac{|\overline{V} - W|}{1/2 \cdot (|\overline{V}| + |W|)} \quad (115)$$

as the magnitude of their difference vectors and as a ratio of the averages of the magnitudes of the two vectors. When the degree of mobility or immobility P is close to 0, the precipitation fields are mobile, and when P is large, the precipitation fields are determined to be immobile. In the case where P has an intermediate value, the characteristics of the precipitation fields are considered to be between being mobile and immobile. Then, the degree of mobility or immobility changes gradually in that interval. The situation of this determining process is illustrated in FIG. 13.

Further, as a method other than the one described above, it is also possible to use one which calculates the angle difference between the representative value of the local velocity of the fields contained in the precipitation fields s and the candidate moving velocity vector W of the precipitation fields.

The precipitation field moving velocity estimating portion 2204 determines the velocity of the precipitation fields employed in the forecast from the moving velocity candidate of the precipitation fields obtained by the precipitation field velocity candidate computing portion 2202 and the degree of mobility or immobility P obtained by the precipitation field characteristics determining portion 2203.

Here, as a method to accomplish the above, a monotonously decreasing function of the degree of mobility or immobility P is defined, and by normalizing after multiplying the moving velocity candidate of the precipitation fields to this function value, the velocity of the precipitation fields are determined.

It is possible to use the following Sigmoid function f $$f(P) = \frac{a}{1 + \exp(b \cdot P - c)} \quad (116)$$

as the monotonously decreasing function.

Figure 14:
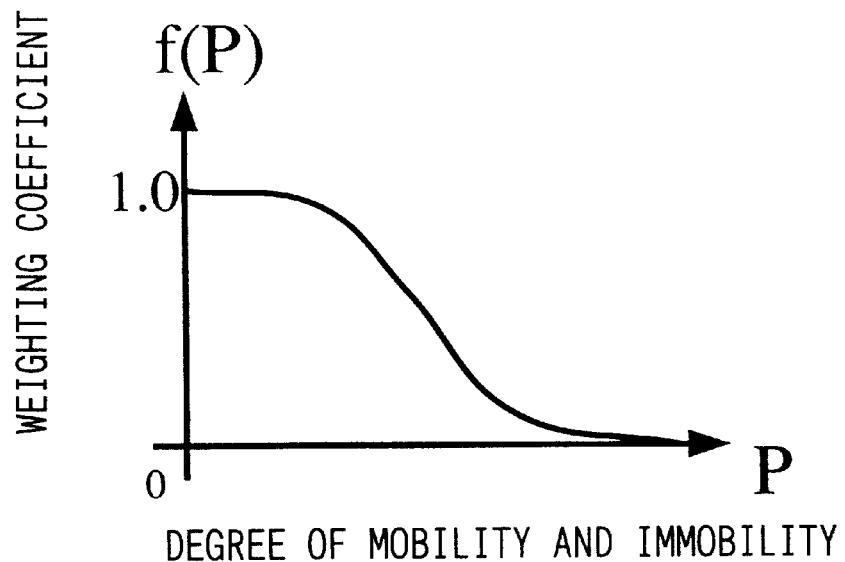
FIG. 14 is a diagram illustrating the situation of the weighting function for determining the moving velocity of the precipitation field.

Here, a, b, and c are positive constants. The appearance of this function f is illustrated in FIG. 14.

It is also possible to use a function other than the one described above. For example, the ramp function may also be employed.

The velocity vector U of the precipitation fields may be calculated as follows:

$$U = f(P)W \quad (117)$$

by employing the function f, the vector W of the moving velocity candidate of the precipitation fields obtained by the precipitation field velocity candidate computing portion 2202, and the degree of mobility or immobility P obtained by the precipitation field characteristics determining portion 2203.

It is also possible to use velocity determining methods other than the one described above.

The forecast image generating portion 205 generates forecast images for arbitrary posterior times from the velocity U of the precipitation fields obtained by the precipitation field moving velocity estimating portion 2204, and the weather radar images obtained by the input portion 100.

The following method will be explained as a concrete example. With respect to the individual precipitation fields s extracted by the precipitation field velocity candidate computing portion 2202, an image $P_s$ (x, y), which is the appropriate field extracted from the most current weather radar image, is created, and by parallel translating this image $P_s$ (x, y) by the velocity U of the precipitation field obtained by the precipitation field moving velocity estimating portion 2204, the forecast image is generated. In addition, by synthesizing the forecast images generated for all of the precipitation fields, the forecast images, which are to be the output, are generated.

Figure 16:
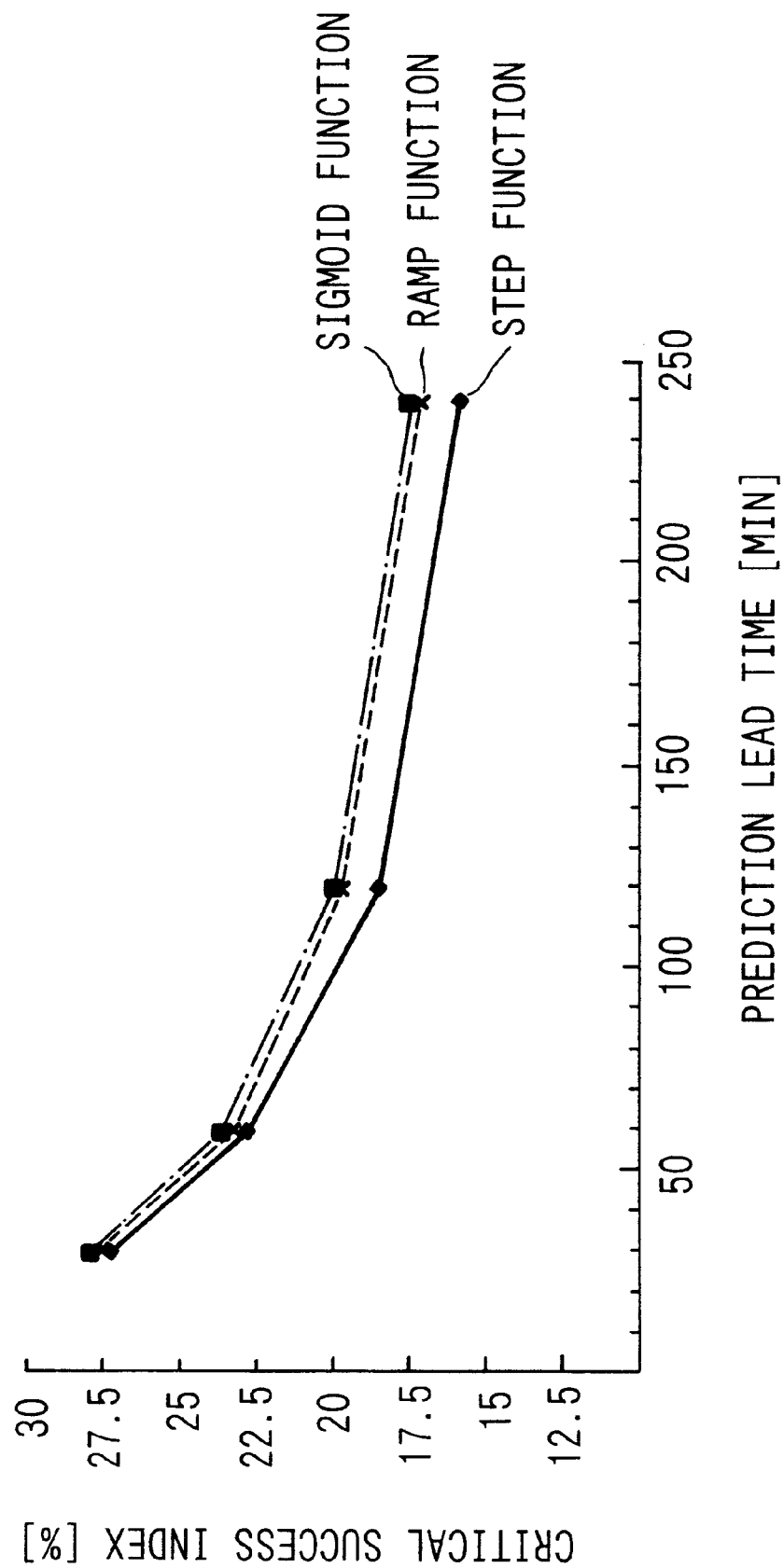
FIG. 16 is a diagram illustrating the relation between the prediction lead time and the critical success index for the case where a weighting function is employed.

Next, experimental models for monotonously decreasing functions expressing the degree of mobility or immobility P employed by the precipitation field moving velocity estimating portion 2204, based on certain weather radar images and the Critical Success Index (CSI) for each of these functions, are illustrated in FIG. 16.

Figure 15:
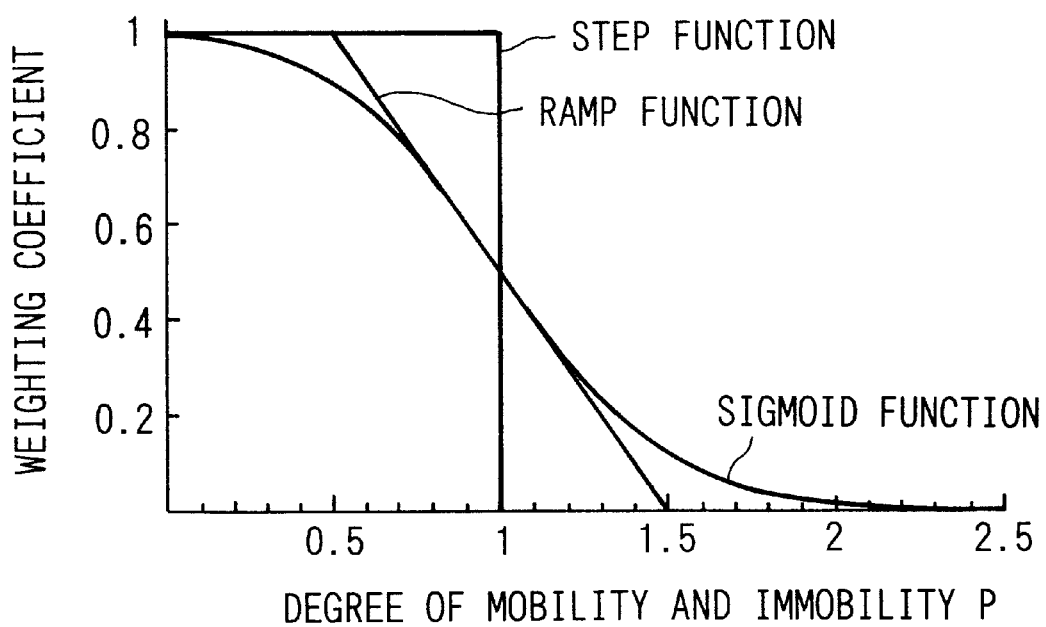
FIG. 15 is a diagram illustrating the situation of each of the weighting function for determining the moving velocity of the precipitation field.

As illustrated in FIG. 15 the monotonously decreasing functions employed in this experiment is as follows: the step function employed by the precipitation field moving velocity estimating portion 1204 in the preferred embodiment 1, and the Sigmoid function or the ramp function employed by the precipitation field moving velocity estimating portion 2204 in the preferred embodiment 2 as a example of a monotonously decreasing function. With respect to the FIG. 15, the horizontal axis is the degree of mobility or immobility P, and concretely speaking, it is the difference of the velocity vector obtained from the displacement of the centroid of the precipitation fields and the local average velocity vector obtained by the echo velocity field computing portion 2201.

According to FIG. 16, the use of the Sigmoid function or the ramp function employed in the present preferred embodiment improves the Critical Success Index (CSI), when compared to the step function employed by the preferred embodiment 1. It is especially apparent that as the prediction lead time increases, the effects are greater. With respect to FIG. 16, the number of pixels of the precipitation fields of the forecast image which missed the forecast with respect to the actual measured image and its prediction lead time is A (the case where it did not when precipitation was forecasted), the number of pixels for which the precipitation fields of the forecast image matched that of the actual measured image is B, and the number of pixels for which the forecast image was off with respect to the precipitation fields of the actual measured image is C (the case where id did when precipitation was not forecasted). Then, the Critical Success Index (CSI) is defined as $$CSI\ [\%] = \{B\ /(A+B+C)\} \times 100.$$

Furthermore, the precipitation field moving velocity estimating portion 2204 described above performs the estimating with the global moving velocities of the precipitation fields obtained by the precipitation field velocity candidate computing portion 2202, regardless of the prediction lead time which is the forecasting time requested at the forecast image generating portion 205. In the case where the prediction lead time is within the standard time, the moving velocity of the precipitation field is estimated by employing the representative value of the velocity of the local echo of the field contained in the precipitation field s and by using the velocity field obtained from the echo velocity field computing portion 2201. And in the case where the prediction lead time falls after the standard time, the forecasting may be performed using the global moving velocities as described above. This is because, in the case where the prediction lead time is extremely short, there is a tendency for a uniform parallel translation due to the small amount of appearances, dissipations, and deformations of the echoes, and by generating a forecast image at the forecast image generating portion 205 by employing the local moving velocities of the echoes, it is possible to improve the Critical Success Index of a short term forecast. Furthermore, it may desirable to define the above mentioned standard time according to the region and the season.

As the characteristics of the weather radar images, with respect to the precipitation fields with large mobility, the local velocities of the echoes and the global velocities of the precipitation fields are often similar in direction and magnitude. And with respect to the precipitation fields with large immobility, the influences of the appearances and dissipations of the echoes far excel those of the movements, thereby putting the direction and the magnitude of the local velocities of the echoes in disarray, and often does not match then global velocities of the precipitation fields.

Therefore, the precipitation field characteristics determining portion 2203 of the processing portion 200 of the present preferred embodiment determines this type of degree of mobility or immobility which is the characteristics of a precipitation field within the weather radar images based on the similarities between the local velocities of the echoes and the global velocities of the precipitation fields. As a result, it is possible to determine very accurately the tendencies of the immobility or mobility of the precipitation fields in line with the actual phenomena.

The precipitation field moving velocity estimating portion 2204 multiplies the degree of mobility or immobility of the precipitation fields to the moving velocities calculated beforehand, and estimates the moving velocities of the precipitation fields employed in the forecast. Therefore, in the case of immobility with large influences from appearances, dissipations, deformations and such, the unstable elements such as appearances, dissipations, and deformations may be suppressed by keeping the velocity of the precipitation fields small, and may estimate stable moving velocities. In addition, when the precipitation fields are determined to be mobile, it is possible to very accurately forecast future weather radar images by employing velocities which are comparably close to the moving velocities calculated from the displacement of the centroid of the precipitation fields by the precipitation field velocity candidate computing portion 2202 and such.

Additionally, the precipitation field characteristics determining portion 2203 employs a function which changes continuously and gradually as a function of the difference between the local velocity vector of the echoes and the global velocity vectors of the precipitation fields, in order to obtain the degree of mobility or immobility. Accordingly, it is possible to perform stable forecast of weather radar images even for cases where slight variations appear in the characteristics of the echoes.

As explained above, the present invention may reduce unfavorable influences due to unstable elements such as appearances, dissipations, and deformations of radar echoes by estimating the moving velocities of the precipitation fields, employed in the forecast, based on the characteristics of the precipitation fields which are the echo cells and their groups within the weather radar images. And the present invention has the effect of forecasting very stable and accurate weather radar images.

Preferred Embodiment 3)

Figure 17:
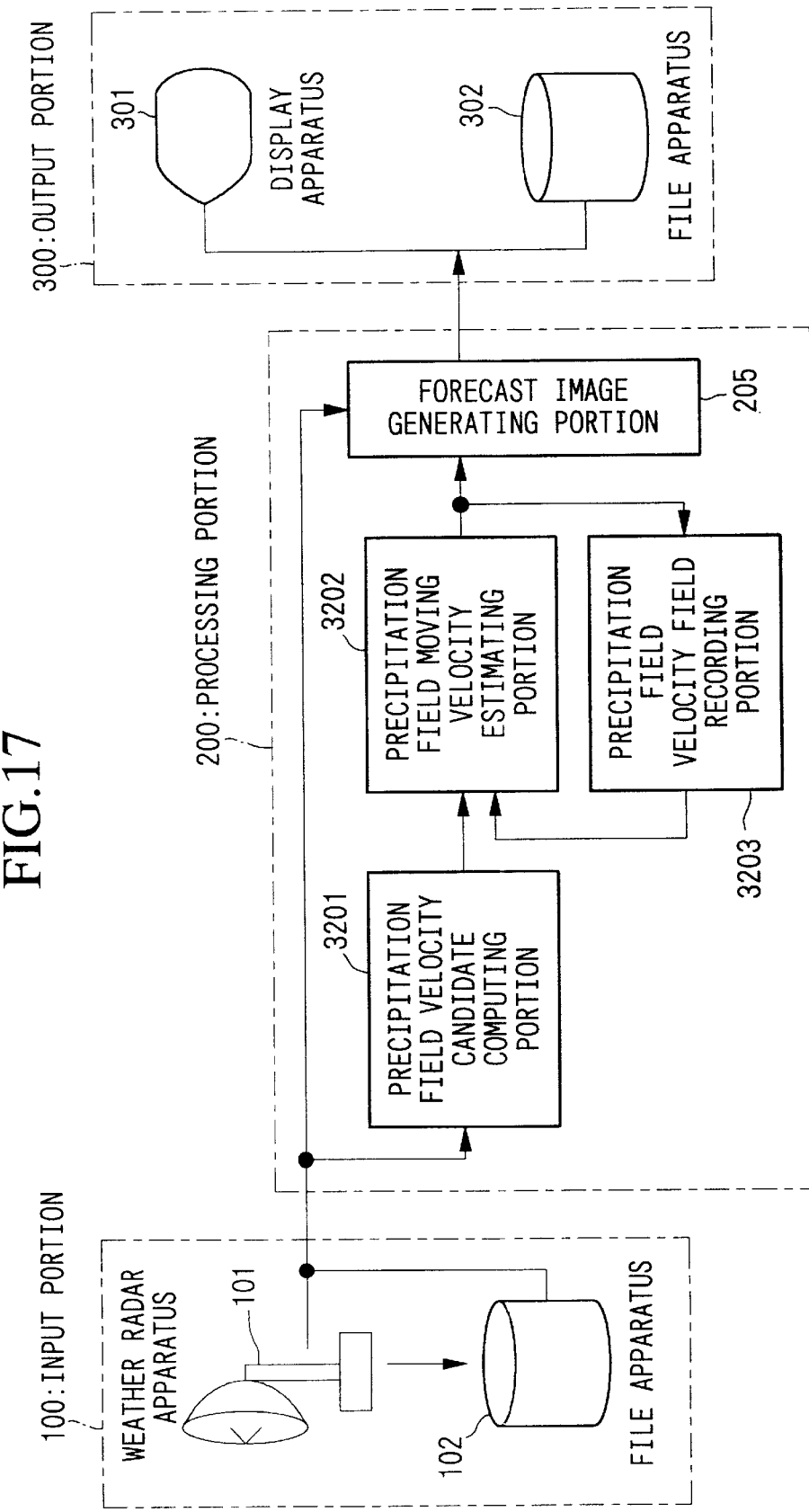
FIG. 17 is a structural diagram of an equipment for weather image prediction of the preferred embodiment 3 of the present invention.

FIG. 17 is a structural diagram of the equipment for weather image prediction of the preferred embodiment 3 of the present invention. Each of the portions of FIG. 17 which have correspondence to the portions of FIG. 1 are applied identical reference numerals.

The equipment for weather image prediction of the present preferred embodiment is formed by an input portion 100, a processing portion 200, and an output portion 300. The input portion 100 is formed by a weather radar apparatus 101 which obtains the weather radar images, and a file apparatus 102 which stores the weather radar images.

The processing portion 200 is formed by a precipitation field velocity candidate computing portion 3201 which obtains the velocity fields of the local echoes within the images from a plurality of frames of the weather radar images, and extracts the precipitation fields, and then calculates the velocity candidates of each of the precipitation fields, a precipitation field velocity field recording portion 3203 which records the distribution of velocities of the precipitation fields from the present time to an arbitrary time in the past, a precipitation field moving velocity estimating portion 3202 which estimates the moving velocities of the current precipitation fields to be employed in the forecast, and a forecast image generating portion 205 which generates the forecast images by employing the estimated moving velocities of the precipitation fields.

The following is an explanation of the correspondence between the processing portion 200 of FIG. 1 and that of FIG. 17. The processes of obtaining the velocity fields of the local echoes within the images from a plurality of frames of the weather radar images and the extracting of the precipitation fields by the precipitation field velocity candidate computing portion 3201 correspond to the field extracting portion 201 of FIG. 1. And, the processes of calculating the velocity candidates of the precipitation fields by the precipitation field velocity candidate computing portion 3201 and the precipitation field velocity field recording portion 3203 and the precipitation field moving velocity estimating portion 3202 correspond to the moving velocity estimating portion 202 of FIG. 1.

The output portion 300 is formed by a display apparatus 301 and a file apparatus 302 which displays and stores the generated forecast radar images.

Figure 18:
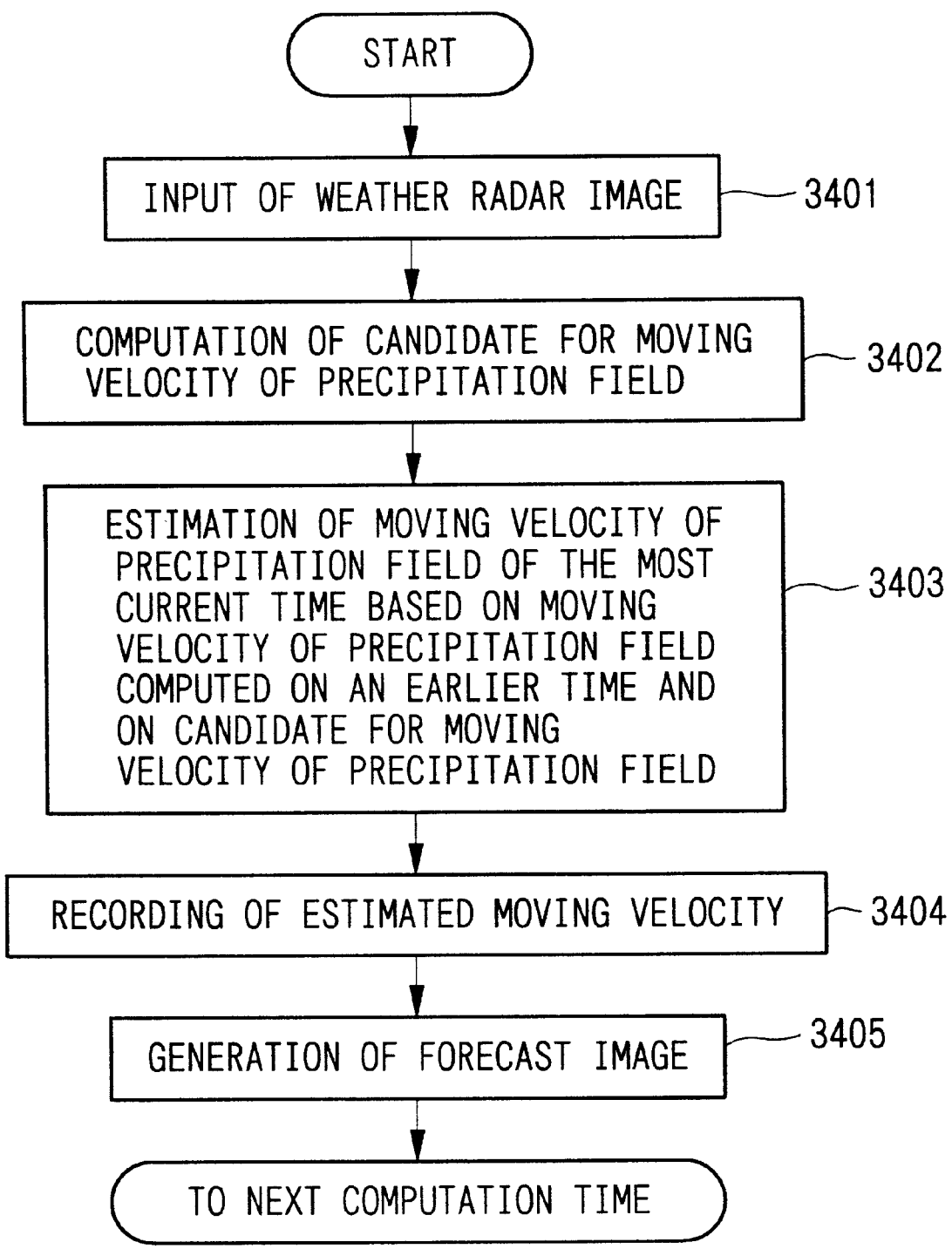
FIG. 18 is a flow chart illustrating the entire operation of the equipment for weather image prediction according to FIG. 17.

FIG. 18 is a flow chart illustrating the operation of the equipment for weather image prediction of FIG. 17. The weather radar images are inputted (step 3401), the moving velocity candidates of the precipitation fields are calculated from the weather radar images from either two proximate frames or a plurality of frames (step 3402), the moving velocities of the precipitation fields to be employed in the forecast are estimated from the moving velocities of the precipitation fields calculated at a past time and the moving velocity candidates of the precipitation fields currently obtained (step 3403), the estimated moving velocities are recorded (step 3404), and the forecast images are generated by employing those moving velocities of the precipitation fields (step 3405).

Next, each of the portions of FIG. 17 will be explained in detail.

The precipitation field velocity candidate computing portion 3201 inputs the weather radar images from either two proximate frames or a plurality of frames, and estimates the moving velocity candidates of the individual precipitation fields contained within these images. These processes of the precipitation field velocity candidate computing portion 3201 correspond to the processes of the echo velocity field computing portion 2201 and the precipitation field velocity candidate computing portion 2202 of the preferred embodiment 2.

Here, as a concrete example, a method (spatio-temporal velocity segmenting method) to extract the precipitation fields based on the uniformity of the velocity fields of the local echoes within the images from the inputted weather radar images of the plurality of frames, and to estimate the moving velocities of the precipitation fields from the displacement of the centroid of the gray level between the frames for each of the precipitation fields, is illustrated.

First, the weather radar images $I_t$ where (t=0, 1, ..., T) of the time sequential T+1 frames from the input portion 100 are inputted, and with respect to the adjacent frames $[I_{t-1}, I_t]$ where (t=1, 2, ..., T), the velocity vector $V_t$ (i, j) of the echoes are calculated for each of the blocks $B_t$ (i, j), where (i=1, 2, ..., M; j=1, 2, ..., N) of the images which have been partitioned into M×N blocks.

In the actual example, it is possible to use the method employed in the cross-correlation method of the image gray level. Now, employing weather radar images $R_1$, $R_2$ which centrally position blocks $B_t$ (i, j) and $B_{t-1}$, (i, j) from the adjacent frames, receptively, the cross-correlation coefficient of the images is calculated by shifting one of images $R_2$ (please refer to FIG. 23).

$$\sigma_{k,l} = \frac{\sum_{i=1}^{A}\sum_{j=1}^{B} R_1(i,j)R_2(i+k, j+l) - AB\overline{R_1}\overline{R_2}}{\sqrt{\left(\sum_{i=1}^{A}\sum_{j=1}^{B} R_1(i,j)^2 - AB\overline{R_1^2}\right)\left(\sum_{i=1}^{A}\sum_{j=1}^{B} R_1(i,j)^2 - AB\overline{R_2^2}\right)}} \quad (201)$$

$$\overline{R_1} = \frac{\sum_{i=1}^{A}\sum_{j=1}^{B} R_1(i,j)}{AB} \quad (202)$$

$$\overline{R_2} = \frac{\sum_{i=1}^{A}\sum_{j=1}^{B} R_2(i+k, j+l)}{AB} \quad (203)$$

Figure 23:
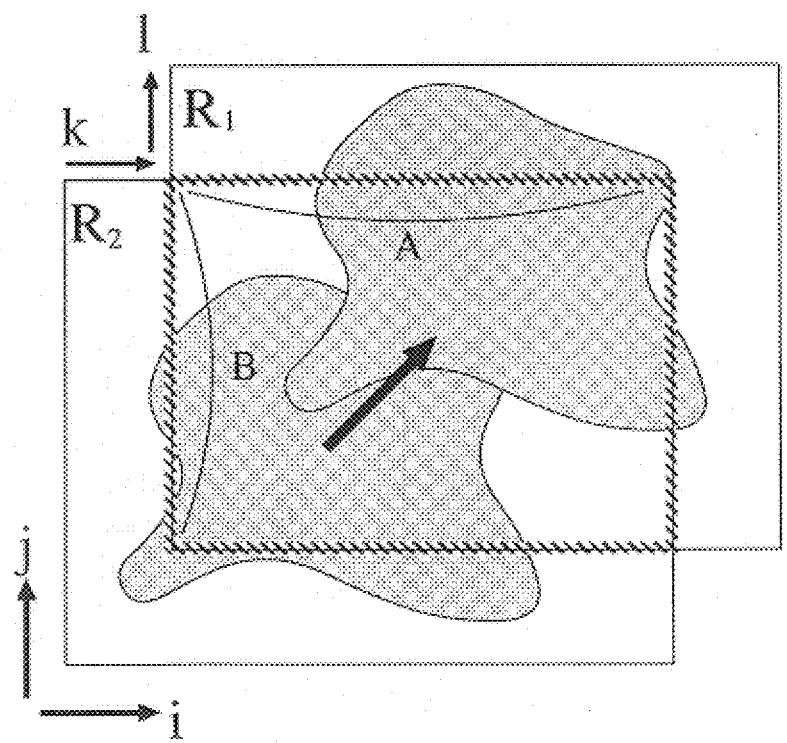
FIG. 23 is a diagram illustrating the situation of the process of the cross-correlation method.

The shift between the two weather radar images $R_1$, $R_2$ is made to be (k, l) when calculating the correlation value and the fields A, B which are to be correlated (m FIG. 23, the oblique lines indicate the field to be correlated, and the bold arrow in the center shows the direction of the movement of the echo pattern).

In addition, the components of the velocity vector $V_t$ (i, j) of the echo may be calculated as follows:

$$V_x = \frac{K}{\Delta t} \quad (204)$$

$$V_y = \frac{L}{\Delta t} \quad (205)$$

from the shift width (K, L) of the greatest correlation value. Here, $V_x$ and $V_y$ indicate the x component and the y component, and $\Delta t$ expresses the time interval of measured times of the radar images.

Figure 21:
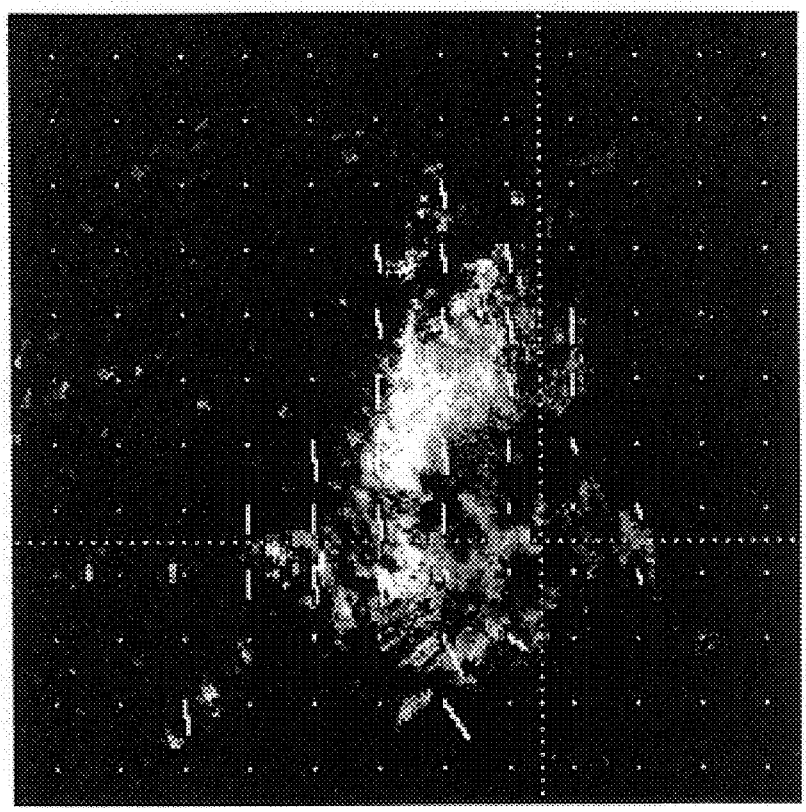
FIG. 21 is a diagram illustrating the velocity field of the echoes obtained by the method of the preferred embodiment 3.
Figure 22:
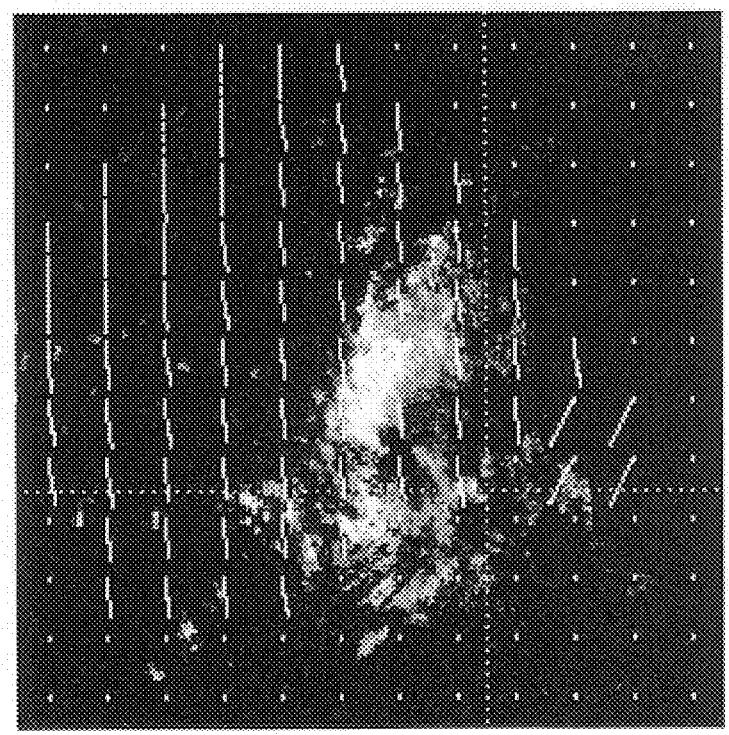
FIG. 22 is a diagram illustrating the velocity field of the statistical value of the moving velocity of a past precipitation field obtained by the method of the preferred embodiment 3.

By performing this type of calculation for each of the blocks, the local velocity fields $V_t$ (i,j ) where (=1, 2, ..., M; j=1, 2, ..., N; t=1, 2, ..., T) of the echoes are calculated. An example of this given in FIG. 21 where the velocity vectors for each of the blocks are over-written as straight lines on the gray level patterns indicating the echoes. The length of these straight lines indicate the magnitude, while the direction indicate the direction of the movement of the echoes.

It is also possible to use methods other than the one described above.

Next, a method to examine the similarities of the velocity vectors from the obtained velocity fields of the echoes with respect to space and time, and to extract the fields possessing similar velocity vectors from the images as a single precipitation field, and to calculate the velocity candidates of the precipitation fields from the displacement of the centroid between the frames, is illustrated.

First, using the velocity fields of the echoes as an input, the velocity vectors of adjacent blocks are compared with respect to space and time, and the fields are segmented so as to have fields possessing similar velocities be part of the same field. Here, as a measure of similarity between two velocity vectors $V_1=(v_{x1}, v_{y1})$ and $V_2=(v_{x2}, v_{y2})$ of two adjacent blocks, the average length of the two vectors and the ratio of the length of their difference vector $$l(V_1, V_2) = \frac{|V_1 - V_2|}{1/2 \cdot (|V_1| + |V_2|)} \quad (206)$$

$$= \frac{\sqrt{(v_{x1} - v_{x2})^2 + (v_{y1} - v_{y2})^2}}{1/2 \cdot \left(\sqrt{v_{x1}^2 + v_{y1}^2} + \sqrt{v_{x2}^2 + v_{y2}^2}\right)}$$

are employed. And a function $S(V_1, V_2)$ will be defined to be 1 in the case the two vectors are similar, and 0 in the case they are not similar, as shown below, $$S(V_1, V_2) = 1 \text{ if } l(V_1, V_2) < TH_v \quad (207)$$

$$S(V_1, V_2) = 0 \text{ if } l(V_1, V_2) \geq TH_v \quad (208)$$

Here, $TH_v$ is a threshold value. It is also possible to use other standards such as the inner product of vectors as a method to calculate similarities.

Next, with respect to each of the blocks within the image, the label $L_t(i, j)$ which indicates the type of precipitation field, is prepared, and the blocks are scanned in a raster-like pattern, and the group of blocks whose echo velocities are similar to the adjacent blocks are applied an identical label. As a result of this type of labeling process, the distribution of the precipitation fields may be obtained as fields possessing identical label $L_t(i, j)$ numbers.

Furthermore, with respect to the groups of blocks possessing identical label numbers (this will simply be referred to as precipitation fields), the moving velocity of the each of the precipitation fields between the frames are calculated from the displacement of the centroids.

The centroid $(G_{xt}(s), G_{yt}(s))$ of the precipitation field s of frame t is calculated as follows:

$$Gx_t(s) = \frac{\sum_x \sum_y x \cdot m_t(s, x, y) \cdot I_t(x, y)}{\sum_x \sum_y m_t(s, x, y) \cdot I_t(x, y)} \quad (209)$$

$$Gy_t(s) = \frac{\sum_x \sum_y y \cdot m_t(s, x, y) \cdot I_t(x, y)}{\sum_x \sum_y m_t(s, x, y) \cdot I_t(x, y)} \quad (210)$$

$m_t(s, x, y) = 1$ (211)
in the case where $(x, y)$ is included within block $B_t(i, j)$ $m_t(s, x, y) = 0$ in all of the other cases (212)

Here, $m_t(s,x,y)$ is the mask which indicates the existence of the precipitation field s. $(x, y)$ is the coordinate system of the image. $(i, j)$ is the coordinate system of the blocks.

Then, the displacement of the centroid position between the frames is obtained with the following equation.

$$W_t(Wx_t(s)Wy_t(s)) = (Gx_{t+1}(s) - Gx_t(s), Gy_{t+1}(s) - Gy_t(s)) \quad (213)$$

In addition, the candidate velocity of the individual precipitation fields may be calculated as the average of the centroid displacement between the frames as follows:

$$W(s) = (Wx_s, Wy_s) = \frac{1}{T-1}\left(\sum_t Wx_t(s), \sum_t Wy_t(s)\right) \quad (214)$$

It is also possible to use calculating methods of the moving velocities of the precipitation fields other than the method described above.

The precipitation field moving velocity estimating portion 3202 estimates the moving velocities of the precipitation fields for the most current time from the distribution of the moving velocities of the precipitation fields of a past time which is recorded in the precipitation field velocity field recording portion 3203, and the moving velocity candidates of the proximate precipitation fields calculated by the precipitation field velocity candidate computing portion 3201.

The following method is illustrated here as an example of the above.

The precipitation field velocity field recording portion 3203 partitions the weather radar images into M x N blocks, and the moving velocity $u_{t-n}(i, j)$ of a past n time step of the precipitation fields existing in the blocks is recorded for each of the blocks $B_t(i, j)$, where $(i=1, 2, \ldots, M; j=1, 2, \ldots, N)$.

The moving velocity vectors u of a past precipitation field (time $t-1 \tilde{} t-T$) which are presently recorded, are normalized and averaged according to those times.

$$\overline{u}(i, j) = \frac{\sum_{n=1}^{T} b_n u_{t-n}(i, j)}{\sum_{n=1}^{T} b_n} \quad (215)$$

Figure 20:
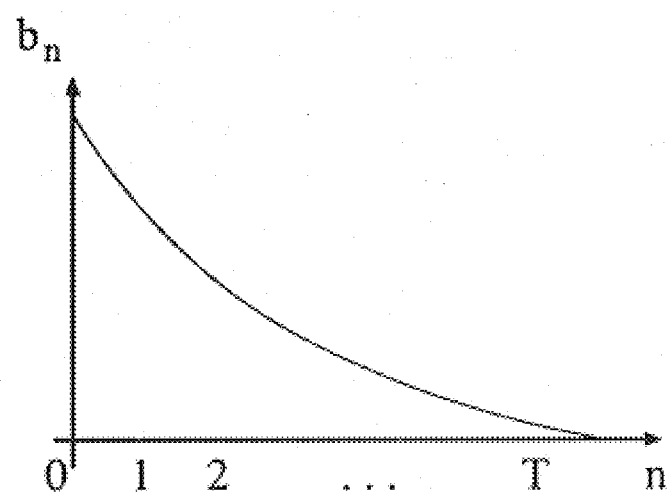
FIG. 20 is a diagram illustrating the normalized coefficient for the statistics of the velocity of a past precipitation field.

Here, it is possible for the normalized coefficient $b_n$ to employ a function which decreases along with the passing of time as illustrated in FIG. 20. Moreover, it is possible to use other functions. Furthermore, other statistical methods may also be used.

From the velocity fields u (i, j) of the moving velocities of the precipitation fields of a past time obtained in this manner, the statistical value R(s) of the moving velocity vectors of the precipitation fields for the appropriate portions of the precipitation fields s extracted by the precipitation field velocity candidate computing portion 3201, is calculated.

$$R(s) = \frac{\sum_{(i,j) \in s} c(i, j) \overline{u}(i, j)}{\sum_{(i,j) \in s} c(i, j)} \quad (216)$$

Here, c (i, j) is a coefficient which expresses the confidence measure of the statistical value u (i, j) of the moving velocity vectors of the precipitation fields of a past time of the block (i, j), and is a function where when the confidence measure is high, c (i, j) is close to 1, and when the confidence measure is low, c (i, j) is made to be close to 0. Also, the confidence measure should be changed according to the length of time of rainfall in the past.

Next, the moving velocity vector U(s) of the precipitation field s for the most current time to be employed in the forecast is calculated according to the following equation $$U(s) = aW(s) + (1-a)R(s) \quad (217)$$

from the statistical value R(s) of the moving velocity vectors of the precipitation fields of the past obtained for the precipitation field s, and the moving velocity candidate vector W(s) of the proximate precipitation fields calculated by the precipitation field velocity candidate computing portion 3201. Here, a is a normalized coefficient taking the value between 0 and 1, and in the case where the statistical value of the past is emphasized, a is set to a value close to 0, and in the case where the present velocity is emphasized, a is set to a value close to 1. For example, if the subject precipitation field has just begun to rain, the value of a is set to 1, and the value of a is decreased according to the elapsed time from the moment it started to rain.

In this manner, the moving velocity vector to be employed in the forecast is calculated for the individual precipitation fields, and this is newly recorded in the precipitation field velocity field recording portion 3203.

As a concrete example, it is possible to use a method for recording the value of the moving velocity vector U(s) for all of the blocks (i, j) contained in the precipitation field s.

$$\forall (i,j) \in s \ u_t(i,j) \leftarrow U(s) \qquad (218)$$

The forecast image generating portion 205 generates the forecast images of an arbitrary posterior time from the velocity U(s) of the precipitation field s obtained by the precipitation field moving velocity estimating portion 3202, and the weather radar images obtained by the input portion 100.

The following method will be explained as a concrete example. The images P(s) (x, y) extracting the appropriate fields from the most current radar images for the individual precipitation fields s extracted by the precipitation field velocity candidate computing portion 3201 is created, and by parallel translating the images P(s) (x, y) by the velocity U(s) of the precipitation field obtained by the precipitation field moving velocity estimating portion 3202, the forecast images is generated. Then, by synthesizing the generated forecast images for all of the precipitation fields, the forecast images which is to be the output, are generated.

Furthermore, the precipitation field moving velocity estimating portion 3202 described above performs the forecasting with the global moving velocities of the precipitation fields obtained by the precipitation field velocity candidate computing portion 3201, regardless of the prediction lead time which is the forecasting time requested at the forecast image generating portion 205. In the case where the prediction lead time is within the standard time, the moving velocity of the precipitation field is forecasted by employing the representative value of the velocity of the local echo of the field contained in the precipitation field s and by using the velocity field obtained from the precipitation field velocity candidate computing portion 3201. And in the case where the prediction lead time falls after the standard time, the forecasting may be performed using the global moving velocities as described above. This is because, in the case where the prediction lead time is extremely short, there is a tendency for a uniform parallel translation due to the small amount of appearances, dissipations, and deformations of the echoes, and by generating a forecast image at the forecast image generating portion 205 by employing the local moving velocities of the echoes, it is possible to improve the Critical Success Index of a short term forecast. Furthermore, it may be desirable to define the above mentioned standard time according to the region and the season.

The individual cells of the radar echoes within the weather radar images may be generalized as moving along with the flow of the atmosphere, and they constantly repeat the process of deformation and appearance and dissipation. As a result, it is known that the velocities of the local echoes and the velocities of the global precipitation fields do not necessarily match. In addition, the activity of the global precipitation fields extend over a large time scale due to such continuous phenomena as the appearances and dissipations of local echoes, and the velocity of the precipitation fields have a tendency of changing smoothly and relatively gently.

In the aforementioned cross-correlation method, since the moving velocities of the precipitation fields are estimated by employing the cross-correlation coefficient of a wide range gray level of two frames of the weather radar images, the velocities of the local echoes and the velocities of the global precipitation fields are confused, and there is a problem of not obtaining a stable velocity due to the influences of the deformations, appearances, and dissipations of the echoes. In addition, with the conventional spatio-temporal velocity segmenting method, the individual precipitation fields are extracted from a plurality of frames of the weather radar images, and then the moving velocities are estimated. Therefore, this method has the problem of the results being unstable again, due to the deformations, appearances, and dissipations of the echoes.

In contrast, with the present invention, instead of the velocities of the local echoes, the distribution of the velocities of the precipitation fields including the effects of the appearances, dissipations, deformations, and such which are effective in the forecast, may be estimated for each of the individual precipitation fields for specific times by the precipitation field velocity candidate computing portion 3201, and the spatial distribution and the temporal distribution of the moving velocities of the precipitation fields are recorded by the precipitation field velocity field recording portion 3203. And, since the moving velocities of the precipitation fields which are to be employed in the forecast are estimated from the statistical values of the moving velocities of the precipitation fields from the present to an arbitrary time in the past by the precipitation field moving velocity estimating portion 3202, the influences of the deformations, appearances, and dissipations of the echoes may be suppressed, and very stable and accurate moving velocities of the precipitation fields may be obtained. As a result, it is possible to perform a stable and accurate forecast of weather radar images for the future.

As explained above, by recording the spatial distribution and the temporal distribution of the moving velocities of the precipitation fields from the present to a time in the past, and by estimating the moving velocities of the current precipitation fields employing those statistical values, the present invention is able to reduce the unfavorable influences of the unstable elements such as the appearances, dissipations, and deformations of the radar echoes, and also has the effect of being able to perform a very stable and accurate forecast of weather radar images. In addition, since the velocities of the precipitation fields have a large dependency on its position and terrain, peculiar tendencies of the moving velocities due to the terrain is accumulated and recorded, and by employing these accumulated velocities which are recorded, it is possible to obtain moving velocities which reflect the tendencies of the terrain.

(Preferred Embodiment 4)

The present preferred embodiment is a combination of the preferred embodiment 2 and the preferred embodiment 3. Here, after estimating the moving velocities of the precipitation fields which takes into consideration the mobility and immobility described in the preferred embodiment 2, the spatial distribution and the temporal distribution of the precipitation fields from the present to an arbitrary time in the past are employed which are recorded as described in the preferred embodiment 3 as opposed to the estimated moving velocities, and the present preferred embodiment illustrates the case where forecast amendments of arbitrary moving velocities of the precipitation fields of the most current time.

Figure 24:
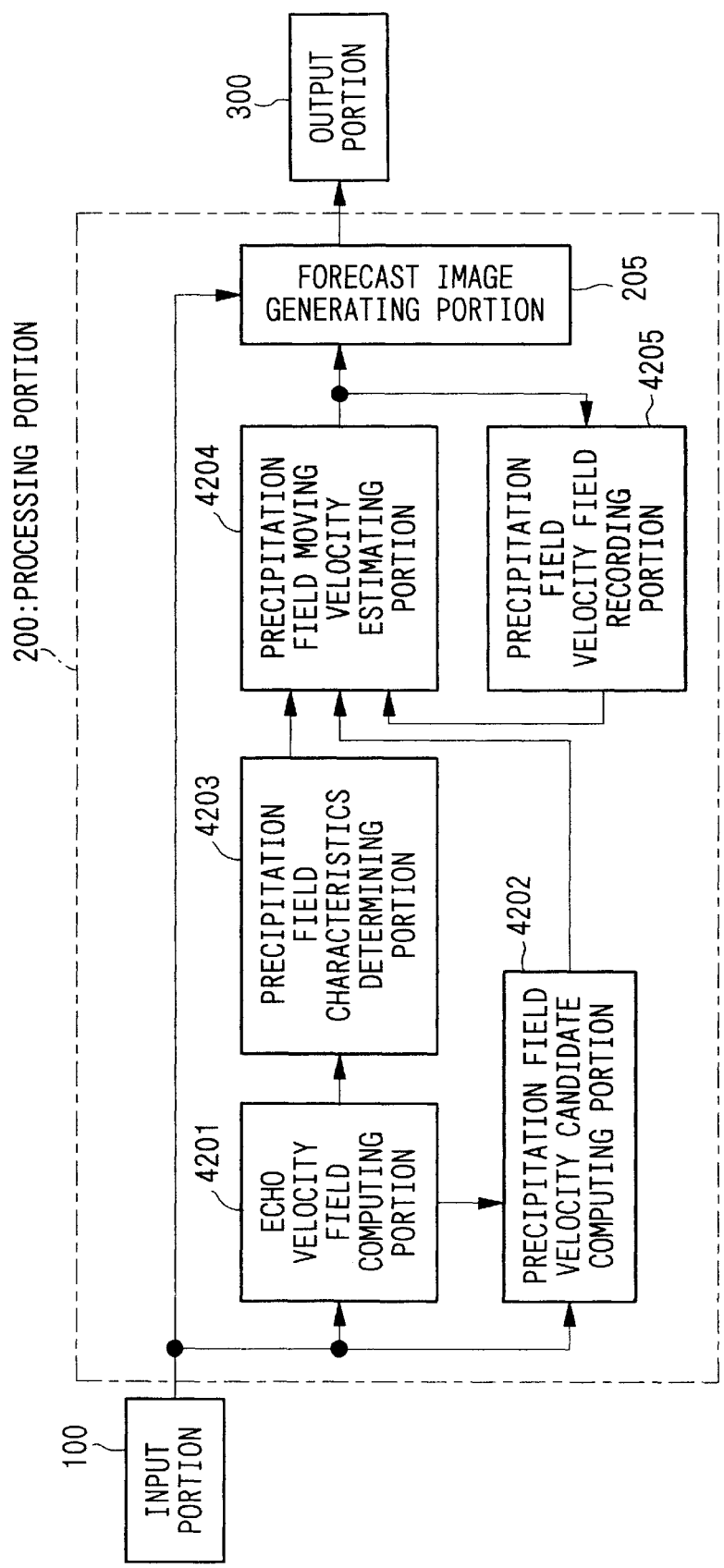
FIG. 24 is a structural diagram of an equipment for weather image prediction of the preferred embodiment 4 of the present invention.

FIG. 24 is a structural diagram of the equipment for weather image prediction of the preferred embodiment 4 of the present invention. Each of the portions of FIG. 24 which have correspondence to the portions of FIG. 1 are applied identical reference numerals.

The equipment for weather image prediction of the present preferred embodiment is formed by an input portion 100, a processing portion 200, and an output portion 300. The input portion 100 is formed by a weather radar apparatus (not illustrated in diagram) which obtains the weather radar images, and a file apparatus which stores the weather radar images (not illustrated in diagram).

The processing portion 200 is formed by an echo velocity field computing portion 4201 which calculates the local velocities of the echoes of the weather radar images, a precipitation field velocity candidate computing portion 4202 which obtains the precipitation fields from within the weather radar images, and calculates the velocity candidate of these precipitation fields, a precipitation field characteristics determining portion 4203 which determines the characteristics of the precipitation fields (the immobility or mobility of the precipitation fields) from the local velocity fields of the echoes and from the candidate velocities of the precipitation fields, a precipitation field velocity field recording portion 4205 which records the distribution of the velocities of the precipitation fields from the present to an arbitrary time in the past, a precipitation field moving velocity estimating portion 4204, which obtains the velocities of the precipitation fields from the degree of immobility or mobility which are the estimated characteristics of the precipitation fields, and which further amends the present moving velocities of the precipitation fields which are to be used in the forecast, from the recorded velocity distribution of the precipitation fields, and a forecast image generating portion 205 which generates the forecast images by employing the estimated moving velocities of the precipitation fields.

The following is an explanation of the correspondence between the processing portion 200 of FIG. 1 and that of FIG. 24. The processes of the echo velocity field computing portion 4201 and the processes to extract the precipitation fields from the weather radar images of the precipitation field velocity candidate computing portion 4202 correspond to the precipitation field extracting portion 201 of FIG. 1. In addition, the processes of calculating the velocity candidate of the precipitation fields of the precipitation field velocity candidate computing portion 4202 and the precipitation field characteristics determining portion 4203, the precipitation field moving velocity estimating portion 4204, and the precipitation field velocity field recording portion 4205 correspond to the moving velocity estimating portion 202 of FIG. 1.

The output portion 300 is formed by the display apparatus (not illustrated in diagram) and the file apparatus (not illustrated in diagram) which respectively display and store the generated forecast radar images.

Figure 25:
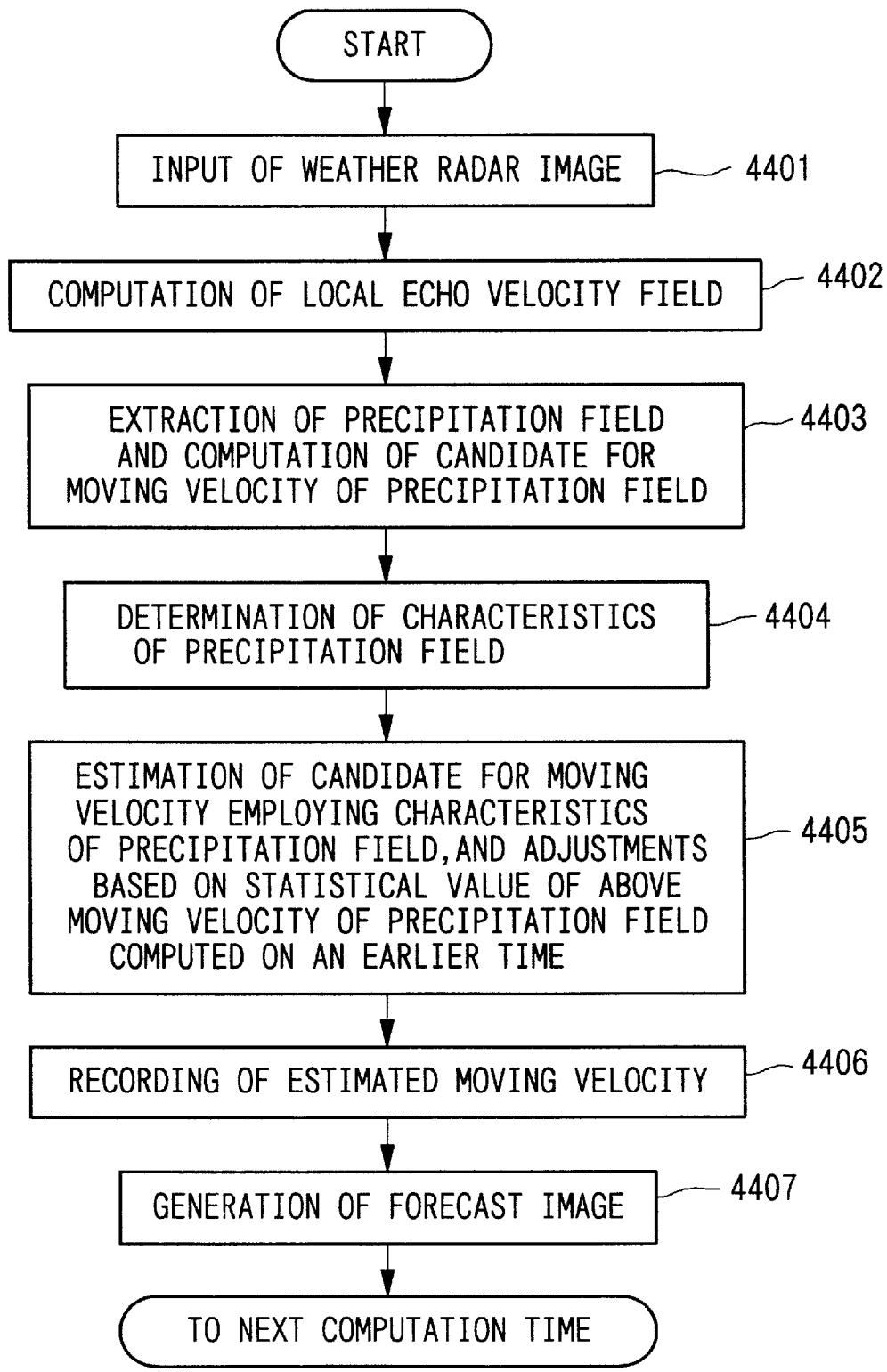
FIG. 25 is a flow chart illustrating the entire operation of the equipment for weather image prediction according to FIG. 24.

FIG. 25 is a flow chart illustrating the operations of the equipment for weather image prediction of FIG. 24. The weather radar images are inputted (step 4401), the local velocity fields of the echoes are calculated (step 4402), and the individual precipitation fields are extracted from the weather radar images and the moving velocity candidates for each of the individual precipitation fields are calculated (step 4403). Then, the degree of immobility or mobility of the precipitation fields are determined from the candidate moving velocities of the precipitation fields and from the local velocity fields of the echoes (step 4404). After the moving velocities of the precipitation fields which are to be employed in the forecast are estimated from the determined degree of mobility or immobility and from the candidate moving velocities of the precipitation fields, the estimated amendments are performed by employing the statistical values of the calculated moving velocities of the precipitation fields of a time in the past as opposed to the estimated moving velocities of the precipitation fields (step 4405), the estimated moving velocities are recorded (step 4406), and the forecast images are generated employing those moving velocities of the precipitation fields (step 4407).

The following is an explanation of the correspondence between FIG. 10, FIG. 17, and FIG. 24. The echo velocity field computing portion 4201 and the precipitation field velocity candidate computing portion 4202 and the precipitation field characteristics determining portion 4203 of FIG. 24 correspond to the echo velocity field computing portion 2201 and the precipitation field velocity candidate computing portion 2202 and the precipitation field characteristics determining portion 2203 of FIG. 10, respectively. Also, the precipitation field velocity field recording portion 4205 correspond to the precipitation field velocity field recording portion 3203 of FIG. 17. In addition, the precipitation field moving velocity estimating portion 4204 of FIG. 24 combine the functions of the precipitation filed moving velocity estimating portion 2204 of FIG. 10 and the precipitation field moving velocity estimating portion 3202 of FIG. 17, and after performing the processes of the precipitation filed moving velocity estimating portion 2204 of FIG. 10, amends the forecasted moving velocities by the processes of the precipitation field moving velocity estimating portion 3202 of FIG. 17. Furthermore, the forecast image generating portion 205 correspond to the forecast image generating portion 205 of each of the preferred embodiments. In this manner, each of the processing portions which form the processing portion 200 of the present preferred embodiment correspond to one or more of the processing portions which form the processing portion 200 of the preferred embodiment 2 and the preferred embodiment 3. Hence, the detailed explanation of the operations of each of the processing portions will be omitted.

Furthermore, the precipitation field moving velocity estimating portion 4204 described above performs the forecasting with the global moving velocities of the precipitation fields employing the values obtained by the precipitation field velocity candidate computing portion 4202, regardless of the prediction lead time which is the forecasting time requested at the forecast image generating portion 205. In the case where the prediction lead time is within the standard time, the moving velocity of the precipitation field is forecasted by employing the representative value of the velocity of the local echo of the field contained in the precipitation field s and by using the velocity field obtained from the echo velocity field computing portion 4201. And in the case where the prediction lead time falls after the standard time, the forecasting may be performed using the global moving velocities as described above. This is because, in the case where the prediction lead time is extremely short, there is a tendency for a uniform parallel translation due to the small amount of appearances, dissipations, and deformations of the echoes, and by generating a forecast image at the forecast image generating portion 205 by employing the local moving velocities of the echoes, it is possible to improve the Critical Success Index of a short term forecast Furthermore, it may desirable to define the above mentioned standard time according to the region and the season.

(Results of the Experiments)

Figure 26:
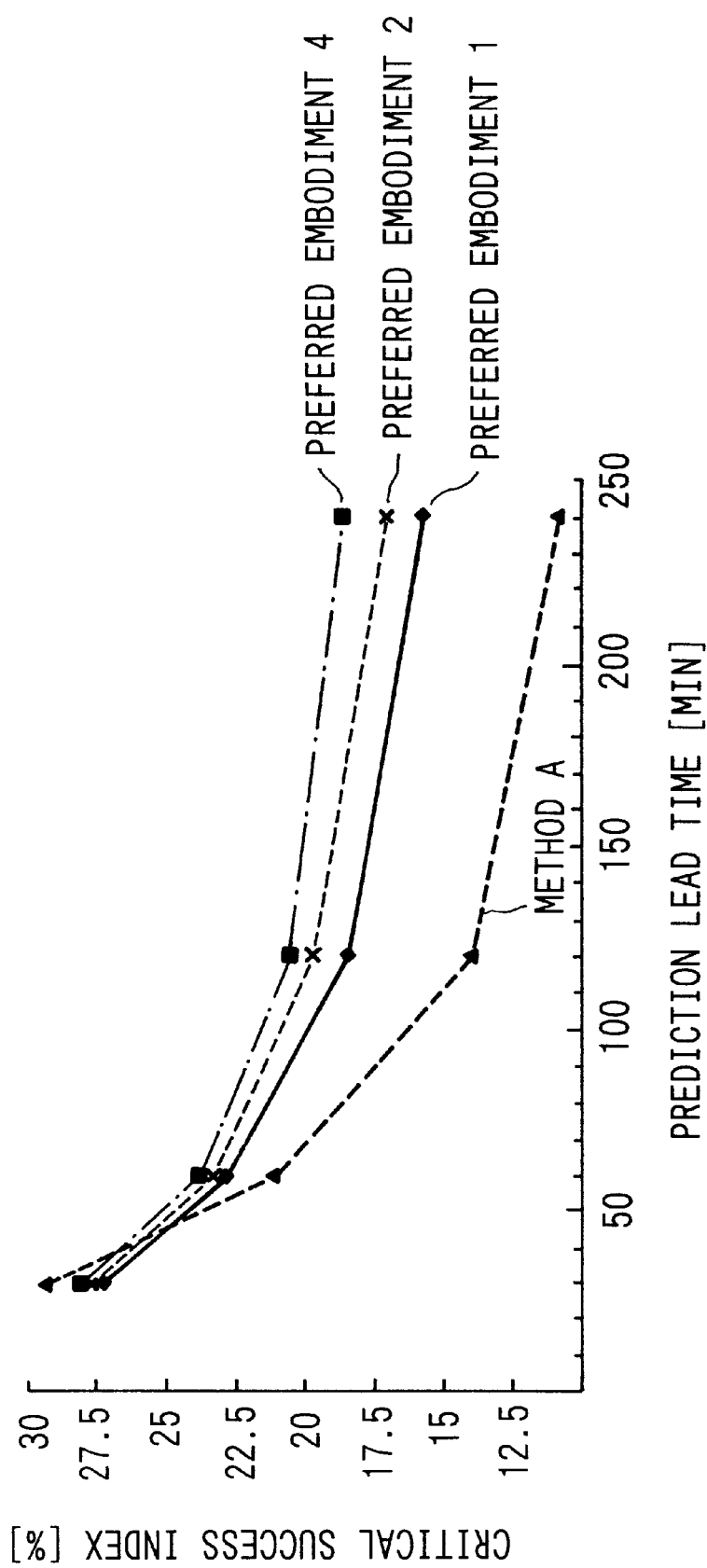
FIG. 26 is a diagram illustrating the relation between the critical success index and the prediction lead time of the equipment for weather image prediction according to each embodiment.

Next, experiments employing certain weather radar images were conducted for the Critical Success Indices relating to the cases where the weather image prediction methods described in the preferred embodiment 1, the preferred embodiment 2, and the preferred embodiment 4 are employed, and the results of thereof are illustrated in FIG. 26.

According to FIG. 26, the Critical Success Indices relating to each of the preferred embodiments are more favorable than that of method A described in the related art. It is especially apparent that as the prediction lead time is greater, the differences become greater. These differences in the Critical Success Indices may be considered to be the effects of the processes of the present invention of segmenting the weather radar images and obtaining the precipitation fields, and of forecasting the moving velocities for each of the precipitation fields.

In addition, the method illustrated in the preferred embodiment 2 has a more favorable Critical Success Index than that illustrated in the preferred embodiment 1. Also, by estimating the moving velocities of the precipitation fields by taking into consideration the mobility or immobility of the precipitation fields, the improvement of the Critical Success Index was verified.

Additionally, the method illustrated in the preferred embodiment 4 has a more favorable Critical Success Index than that illustrated in the preferred embodiment 2. Also, the improvement of the Critical Success Index depending on the estimation of the moving velocities employing the statistical values of the moving velocities of the precipitation fields from the present to an arbitrary time in the past, was further verified. Furthermore, the definition of the Critical Success Index of the vertical axis is as explained with reference to FIG. 16.

The equipment and method for weather image prediction of the present invention have special features in the construction and operation of the processing portion 200, and the input portion 100 and the output portion 300 of this equipment and method are optional features. Also, the managing portion 200 alone may comprise the function as the equipment for weather image prediction.

It is also possible perform the weather image prediction by recording on a computer readable recording medium the program to execute the processes of the above described managing portion 200, and by having the computer read and execute the program which was recorded on the above recording medium.

It is also possible to use the above described equipment and method for weather image prediction, not solely for the forecast of local short term precipitation by employing the weather radar images, but also in administrative fields such as snow removal management, sewerage management, and disaster forecasts by employing the forecasted precipitation information, in commercial fields such as product management, inventory management, and sales forecast by employing the forecasted precipitation information, and in transportation fields such as airplane operation and control by employing the forecasted precipitation information.

What is claimed is:

1. An equipment for weather image prediction comprising:

a field extracting portion, which calculates the velocity fields of local echoes with respect to time and space from a plurality of time sequential frames of weather radar images for a plurality of frames therein, and which segments and extracts a field possessing similar velocities with respect to time and space as one precipitation field from said plurality of frames of weather radar images by employing said calculated velocity fields;

a moving velocity estimating portion, which estimates the moving velocity of a precipitation field by obtaining the amount of movement, among the neighboring frames, of the precipitation field segmented and extracted by said field extracting portion; and a forecast image generating portion, which extrapolates a plurality of precipitation fields by employing a distance taken by multiplying the moving velocity of the precipitation field estimated by said moving velocity estimating portion by a desired forecasting time, and which generates a forecast radar image by synthesizing the resulting image.

2. An equipment for weather image prediction in accordance with claim 1 wherein said field extracting portion calculates said velocity fields of the echoes from the location where the cross-correlation coefficient of the partial image gray level of two weather radar images is greatest.

3. An equipment for weather image prediction in accordance with claim 1 wherein said field extracting portion obtains said precipitation field by way of comparing the respective velocity vectors of the adjacent blocks of said precipitation field with respect to space and time, and by way of segmenting the weather radar images so as to have fields possessing similar velocities belong to the same precipitation field.

4. An equipment for weather image prediction in accordance with claim 1 wherein said moving velocity estimating portion calculates the average value of the amount of displacement of the centroid of the corresponding precipitation field between frames, and estimates the moving velocity of that precipitation field by employing said average value.

5. An equipment for weather image prediction in accordance with claim 1 wherein said moving velocity estimating portion further comprises:

a precipitation field velocity candidate computing portion which obtains the velocity candidate of the precipitation field segmented and extracted by said field extracting portion, by employing the weather radar images from either two proximate frames or a plurality of frames;

a precipitation field characteristics determining portion which determines the characteristics of the precipitation field segmented and extracted by said field extracting portion; and a precipitation field moving velocity estimating portion which estimates the moving velocity of the precipitation field by taking into consideration the characteristics of the precipitation field obtained by said precipitation field characteristics determining portion, and with respect to the velocity candidate of the precipitation field obtained by said precipitation field velocity candidate computing portion.

6. An equipment for weather image prediction in accordance with claim 5 wherein said precipitation field characteristics determining portion has said characteristics of the precipitation field be given by the degree of mobility or immobility, which is the characteristics of the movement of the precipitation field, which in turn, is the echo cells or the group of echo cells within the weather radar image.

7. An equipment for weather image prediction in accordance with claim 6 wherein said precipitation field characteristics determining portion determines the precipitation field to be mobile in the case where the velocity obtained by said precipitation field velocity candidate computing portion is equal to or exceeds a fixed value, and determines the precipitation field to be immobile in the case where said velocity does not reach the fixed value.

8. An equipment for weather image prediction in accordance with claim 6 wherein said precipitation field characteristics determining portion determines said degree of mobility or immobility by the similarities between the local velocities of the echoes within the weather radar image obtained by said field extracting portion and the global velocity of the precipitation field obtained by said precipitation field velocity candidate computing portion.

9. An equipment for weather image prediction in accordance with claim 8 wherein said precipitation field characteristics determining portion determines said similarity as a function of the angle formed by the velocity vector expressing said local velocities of the echoes and by the velocity vector expressing said global velocity of the precipitation field.

10. An equipment for weather image prediction in accordance with claim 8 wherein said precipitation field characteristics determining portion determines said similarity as a function of the magnitude of the difference of the velocity vector expressing said local velocities of the echoes and the velocity vector expressing said global velocity of the precipitation field.

11. An equipment for weather image prediction in accordance with claim 6 wherein said precipitation field moving velocity estimating portion estimates said moving velocity of the precipitation field as the velocity obtained by said precipitation field velocity candidate computing portion in the case where the precipitation field is determined to be "mobile" by said precipitation field characteristics determining portion, and estimates said moving velocity of the precipitation field as "0" in the case where the precipitation field is determined to be "immobile" by said precipitation field characteristics determining portion.

12. An equipment for weather image prediction in accordance with claim 6 wherein said precipitation field moving velocity estimating portion estimates the moving velocity of the precipitation field which is to be employed in the forecast by way of normalizing the velocity calculated by said precipitation field velocity candidate computing portion by the degree of mobility or immobility obtained by said precipitation field characteristics determining portion.

13. An equipment for weather image prediction in accordance with claim 1 wherein said moving velocity estimating portion records the moving velocity of the precipitation field segmented and extracted by said field extracting portion for a time in the past, and estimates the current moving velocity of the precipitation field by taking into consideration said moving velocity of the precipitation field for a time in the past.

14. An equipment for weather image prediction in accordance with claim 13 wherein said moving velocity estimating portion further comprises:

a precipitation field velocity candidate computing portion which obtains the velocity candidate of the precipitation field segmented and extracted by said field extracting portion, by employing the weather radar images from either two proximate frames or a plurality of frames;

a precipitation field velocity field recording portion which records the spatial distribution of the moving velocity of the precipitation field calculated by said precipitation field velocity candidate computing portion for a plurality of times;

a precipitation field moving velocity estimating portion which estimates the most current moving velocity of an arbitrary precipitation field by employing the spatial distribution and the temporal distribution of the precipitation fields from the present to an arbitrary time in the past recorded by said precipitation field velocity field recording portion.

15. An equipment for weather image prediction in accordance with claim 14 wherein said moving velocity estimating portion estimates said current moving velocity of the precipitation field by using the spatial distribution and the temporal distribution from the present to an arbitrary time in the past from the moving velocity of the precipitation field recorded by said precipitation field velocity field recording portion and by employing the value obtained by normalizing the moving velocity of the precipitation field of the time from the present to an arbitrary time in the past according to those times for the inside of the spatial area corresponding to the current precipitation field.

16. An equipment for weather image prediction in accordance with claim 5 wherein:

said precipitation field moving velocity estimating portion further comprises a precipitation field velocity field recording portion which records the spatial distribution of estimated moving velocity of the precipitation field obtained by said precipitation field moving velocity estimating portion for a plurality of times; and said precipitation field moving velocity estimating portion estimates the moving velocity of the precipitation field by employing the velocity candidate of the precipitation field obtained by said precipitation field velocity candidate computing portion based on the characteristics of the precipitation field obtained by said precipitation field characteristics determining portion, and then performs estimating amendments of the moving velocity of an arbitrary precipitation field of the most current time by employing the spatial distribution and the temporal distribution of the precipitation field moving velocity from the present to an arbitrary time in the past recorded by said precipitation field velocity field recording portion.

17. An equipment for weather image prediction in accordance with claim 16 wherein said precipitation field moving velocity estimating portion performs said estimating amendments of the moving velocity of the precipitation field by employing the spatial distribution and the temporal distribution from the present to an arbitrary time in the past from the moving velocity of the precipitation field recorded by said precipitation field velocity field recording portion and by employing the value obtained by normalizing the moving velocity of the precipitation field of the time from the present to an arbitrary time in the past according to those times for the inside of the spatial field corresponding to the current precipitation field.

18. An equipment for weather image prediction in accordance with claim 1 wherein said moving velocity estimating portion further comprises:

a precipitation field velocity candidate computing portion which obtains the velocity candidate of the precipitation field segmented and extracted by said field extracting portion, by employing the weather radar images from either two proximate frames or a plurality of frames; and a precipitation field moving velocity estimating portion which estimates the moving velocity of the precipitation field by employing either one of the local velocities of the echoes within the weather radar image obtained by said field extracting portion, or the global velocity of the precipitation field obtained by said precipitation field velocity candidate computing portion, depending on the forecasting time requested at said forecast image generating portion.

19. An equipment for weather image prediction in accordance with claim 1 wherein said precipitation field moving velocity estimating portion estimates the moving velocity of the precipitation field by employing the local velocities of the echoes within the weather radar images obtained by said field extracting portion in the case where the forecasting time requested at said forecast image generating portion is equal to or less than a predetermined value, and estimates the moving velocity of the precipitation field by employing the global velocity of the precipitation field obtained by said precipitation field velocity candidate computing portion in any other case.

20. An equipment for weather image prediction in accordance with claim 1 wherein said forecast image generating portion uses the weather radar images contained within each of the individual precipitation fields segmented and extracted by said field extracting portion as a forecast base image which is to be the base image for the forecast, and extrapolates a plurality of precipitation fields by way of performing parallel translation of each of the forecast base images by a distance obtained by multiplying said moving velocity with said requested forecasting time.

21. An equipment for weather image prediction in accordance with claim 20 wherein said forecast image generating portion selects the greatest value of the gray level of said forecast base image from the overlapped plurality of precipitation fields resulting from said parallel translation for each of said plurality of precipitation fields.

22. An method for weather image prediction comprising:
a field extracting step, which calculates the velocity fields of local echoes with respect to time and space from a plurality of time sequential frames of weather radar images for a plurality of frames therein, and which segments and extracts a field possessing similar velocities with respect to time and space as one precipitation field from said plurality of frames of weather radar images by employing said calculated velocity fields;
a moving velocity estimating step, which estimates the moving velocity of a precipitation field by obtaining the amount of movement, among the neighboring frames, of the precipitation field segmented and extracted by said field extracting step; and
a forecast image generating step, which extrapolates a plurality of precipitation fields by employing a distance taken by multiplying the moving velocity of the precipitation field estimated by said moving velocity estimating step by a desired forecasting time, and which generates a forecast radar image by synthesizing the resulting image.

23. A method for weather image prediction in accordance with claim 22 wherein said field extracting step calculates said velocity fields of the echoes from the location where the cross-correlation coefficient of the partial image gray level of two weather radar images is greatest.

24. A method for weather image prediction in accordance with claim 22 wherein said field extracting method obtains said precipitation field by way of comparing the respective velocity vectors of the adjacent blocks of said precipitation field with respect to space and time, and by way of segmenting the weather radar images so as to have fields possessing similar velocities belong to the same precipitation field.

25. A method for weather image prediction in accordance with claim 22 wherein said moving velocity estimating step obtains the velocity candidate of the precipitation field segmented and extracted by said field extracting step, by employing the weather radar images from either two proximate frames or a plurality of frames, determines the degree of mobility or immobility, which is the characteristics of the movement of the precipitation field, which in turn, is the echo cells or the group of echo cells within the weather radar image segmented and extracted by said field extracting step, and estimates the moving velocity of the precipitation field by taking into consideration said determined degree of mobility or immobility of the precipitation field, and with respect to said obtained velocity candidate of the precipitation field.

26. A method for weather image prediction in accordance with claim 22 wherein said moving velocity estimating step records a past moving velocity of the precipitation field segmented and extracted by said field extracting step, and estimates the current moving velocity of the precipitation field by taking into consideration said past moving velocity of the precipitation field.

27. A method for weather image prediction in accordance with claim 22 wherein said moving velocity estimating step obtains the global velocity candidate of the precipitation field segmented and extracted by said field extracting step, by employing the weather radar images from either two proximate frames or a plurality of frames, estimates the moving velocity of the precipitation field by employing the local velocities of the echoes within the weather radar images obtained by said field extracting step in the case where the forecasting time requested at said forecast image generating step is equal to or less than a predetermined value, and estimates the moving velocity of the precipitation field by employing said global velocity candidate of the precipitation field in any other case.

28. A computer readable recording medium which records a program for weather image prediction for execution by a computer comprising:
a field extracting step, which calculates the velocity fields of local echoes with respect to time and space from a plurality of time sequential frames of weather radar images for a plurality of frames therein, and which segments and extracts a field possessing similar velocities with respect to time and space as one precipitation field from said plurality of frames of weather radar images by employing said calculated velocity fields;
a moving velocity estimating step, which estimates the moving velocity of a precipitation field by obtaining the amount of movement, among the neighboring frames, of the precipitation field segmented and extracted by said field extracting step; and
a forecast image generating step, which extrapolates a plurality of precipitation fields by employing a distance taken by multiplying the moving velocity of the precipitation field estimated by said moving velocity estimating step by a desired forecasting time, and which generates a forecast radar image by synthesizing the resulting image.

29. A recording medium which records a program for weather image prediction in accordance with claim 28 wherein said field extracting step calculates said velocity fields of the echoes from the location where the cross-correlation coefficient of the partial image gray level of two weather radar images is greatest.

30. A recording medium which records a program for weather image prediction in accordance with claim 28 wherein said field extracting step obtains said precipitation field by way of comparing the respective velocity vectors of the adjacent blocks of said precipitation field with respect to space and time, and by way of segmenting the weather radar images so as to have fields possessing similar velocities belong to the same precipitation field.

31. A recording medium which records a program for weather image prediction in accordance with claim 28 wherein said moving velocity estimating step obtains the velocity candidate of the precipitation field segmented and extracted by said field extracting step, by employing the weather radar images from either two proximate frames or a plurality of frames, determines the degree of mobility or immobility, which is the characteristics of the movement of the precipitation field, which in turn, is the echo cells or the group of echo cells within the weather radar image segmented and extracted by said field extracting step, and estimates the moving velocity of the precipitation field by taking into consideration said determined degree of mobility or immobility of the precipitation field, and with respect to said obtained velocity candidate of the precipitation field.

32. A recording medium which records a program for weather image prediction in accordance with claim 28 wherein said moving velocity estimating step records a past moving velocity of the precipitation field segmented and extracted by said field extracting step, and estimates the current moving velocity of the precipitation field by taking into consideration said past moving velocity of the precipitation field.

33. A recording medium which records a program for weather image prediction in accordance with claim 28 wherein said moving velocity estimating step obtains the global velocity candidate of the precipitation field segmented and extracted by said field extracting step, by employing the weather radar images from either two proximate frames or a plurality of frames, estimates the moving velocity of the precipitation field by employing the local velocities of the echoes within the weather radar images obtained by said field extracting step in the case where the forecasting time requested at said forecast image generating step is equal to or less than a predetermined value, and estimates the moving velocity of the precipitation field by employing said global velocity candidate of the precipitation field in any other case.

* * * * *